United States Patent
Kurisawa et al.

(10) Patent No.: US 9,719,017 B2
(45) Date of Patent: Aug. 1, 2017

(54) LIQUID CRYSTAL DISPLAY DEVICE AND METHOD FOR MANUFACTURING THE SAME

(71) Applicant: DIC CORPORATION, Tokyo (JP)

(72) Inventors: Kazuki Kurisawa, Kita-adachi-gun (JP); Masanao Hayashi, Kita-adachi-gun (JP); Shinji Ogawa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/765,104

(22) PCT Filed: Jan. 30, 2014

(86) PCT No.: PCT/JP2014/052073
§ 371 (c)(1),
(2) Date: Oct. 19, 2015

(87) PCT Pub. No.: WO2014/123056
PCT Pub. Date: Aug. 14, 2014

(65) Prior Publication Data
US 2016/0108316 A1 Apr. 21, 2016

(30) Foreign Application Priority Data

Feb. 6, 2013 (JP) ................. 2013-021819

(51) Int. Cl.
| | |
|---|---|
| *G02F 1/1333* | (2006.01) |
| *C09K 19/54* | (2006.01) |
| *C08F 220/10* | (2006.01) |
| *C09K 19/18* | (2006.01) |
| *C09K 19/20* | (2006.01) |
| *C09K 19/32* | (2006.01) |
| *C09K 19/36* | (2006.01) |
| *G02F 1/1335* | (2006.01) |
| *G02F 1/1337* | (2006.01) |
| *G02F 1/1341* | (2006.01) |
| *C08F 230/08* | (2006.01) |
| *C09K 19/04* | (2006.01) |
| *C09K 19/12* | (2006.01) |
| *C09K 19/30* | (2006.01) |

(52) U.S. Cl.
CPC ............ *C09K 19/54* (2013.01); *C08F 220/10* (2013.01); *C09K 19/18* (2013.01); *C09K 19/2014* (2013.01); *C09K 19/3003* (2013.01); *C09K 19/32* (2013.01); *C09K 19/322* (2013.01); *C09K 19/36* (2013.01); *G02F 1/1341* (2013.01); *G02F 1/133514* (2013.01); *G02F 1/133707* (2013.01); *G02F 1/133711* (2013.01); *G02F 1/133788* (2013.01); *C08F 230/08* (2013.01); *C09K 2019/0448* (2013.01); *C09K 2019/122* (2013.01); *C09K 2019/183* (2013.01); *C09K 2019/301* (2013.01); *C09K 2019/3004* (2013.01); *C09K 2019/3009* (2013.01); *C09K 2019/3016* (2013.01); *G02F 2001/133357* (2013.01); *G02F 2001/133397* (2013.01)

(58) Field of Classification Search
CPC .... C09K 19/54; C09K 19/18; C09K 19/2014; C09K 19/32; C09K 19/322; C09K 19/36; C09K 19/3003; C09K 2019/0448; C09K 2019/122; C09K 2019/183; C09K 2019/3009; C09K 2019/301; C09K 2019/3016; C09K 2019/3004; G02F 1/1333; G02F 1/133514; G02F 1/133707; G02F 1/133711; G02F 1/133788; G02F 1/1341; C08F 220/10; C08F 230/08
USPC .......................................... 428/1.1; 349/182
See application file for complete search history.

(56) References Cited

U.S. PATENT DOCUMENTS 7,289,178 B2 * 10/2007 Sasabayashi ..... G02F 1/133707
349/123
2013/0114034 A1 5/2013 Archetti et al.

FOREIGN PATENT DOCUMENTS

| JP | 6-235925 A | 8/1994 |
|---|---|---|
| JP | 2002-357830 A | 12/2002 |
| JP | 2006-58755 A | 3/2006 |

(Continued)

OTHER PUBLICATIONS

International Search Report dated Apr. 22, 2014, issued in counterpart International Application No. PCT/JP2014/052073 (2 pages).

*Primary Examiner* — Geraldina Visconti
(74) *Attorney, Agent, or Firm* — Westerman, Hattori, Daniels & Adrian, LLP

(57) ABSTRACT

There is provided a liquid crystal display device which enables reductions in image sticking and droplet stains caused in production thereof without degradation of properties such as dielectric anisotropy, viscosity, the upper limit of the temperature of nematic phase, and rotational viscosity ($\gamma_1$); and there is also provided a method for manufacturing such a liquid crystal display device. The liquid crystal display device is characterized in that a liquid crystal layer containing a liquid crystal composition is disposed between a substrate provided with a common electrode and a color filter layer and another substrate provided with a plurality of pixels each having a pixel electrode, each of the substrates is not provided with an alignment film but provided with an orientation controlling layer composed of at least two polymerizable compounds, each of the pixels has two or more regions having different directions of pretilt, and the liquid crystal composition contains a compound represented by General Formula (I) and a compound represented by General Formula (II).

8 Claims, 2 Drawing Sheets

(56) References Cited

FOREIGN PATENT DOCUMENTS

| JP | 2006-89622 | * | 4/2006 | ............ C09K 19/02 |
| JP | 2008-116675 A | | 5/2008 | |
| WO | 20121007107 A1 | | 1/2012 | |
| WO | 2013/004372 A1 | | 1/2013 | |

* cited by examiner

LIQUID CRYSTAL DISPLAY DEVICE AND METHOD FOR MANUFACTURING THE SAME

TECHNICAL FIELD

The present invention relates to a liquid crystal display device that is useful as a constituent of a liquid crystal TV set or the like, and to a method for manufacturing such a liquid crystal display device.

BACKGROUND ART

Liquid crystal display devices have been applied to, for example, clocks and watches, calculators, a variety of measuring equipment, panels used in automobiles, word processors, electronic notebooks, printers, computers, television sets, clocks, and advertising boards. Representative examples of types of liquid crystal display devices include a TN (twisted nematic) type, an STN (super twisted nematic) type, and vertical alignment (VA) and IPS (in-plane switching) types involving use of a TFT (thin film transistor). Liquid crystal compositions used in such liquid crystal display devices need to satisfy the following requirements: being stable to external elements such as moisture, air, heat, and light; having a liquid crystal phase in a wide temperature range mainly including room temperature as much as possible; having a low viscosity; and enabling a low driving voltage. In addition, liquid crystal compositions are composed of several to tens of compounds to adjust, for example, the dielectric anisotropy ($\Delta\varepsilon$) and refractive index anisotropy ($\Delta n$) to be optimum to individual liquid crystal display devices.

A liquid crystal composition having a negative $\Delta\varepsilon$ is used in VA displays and widely applied to, for instance, liquid crystal TVs. In all types of driving, there have been demands for driving at low voltage, a quick response, and a broad range of operation temperature. In other words, $\Delta\varepsilon$ with a large absolute value, a low viscosity ($\eta$), and a high nematic phase-isotropic liquid phase transition temperature ($T_{NI}$) have been demanded. In order to determine $\Delta n \times d$ that is a product of $\Delta n$ and a cell gap (d), the $\Delta n$ of a liquid crystal composition needs to be adjusted to be in a proper range on the basis of the cell gap. In addition, a quick response is important in liquid crystal display devices applied to television sets or other apparatuses, which generates a need for a liquid crystal composition having a small rotational viscosity ($\gamma_1$).

In order to improve the viewing angle characteristics of VA displays, MVA (multi-domain vertical alignment) liquid crystal displays have been widely used, in which protrusions formed on a substrate enable liquid crystal molecules in pixels to be oriented in multiple directions. In MVA liquid crystal display devices, viewing angle characteristics are good; however, there is a difference in the response speed of liquid crystal molecules between part adjacent to the protrusions formed on a substrate and part distant therefrom, and the liquid crystal molecules that are distant from the protrusions and thus show slow response speed cause the response speed as a whole to be problematically insufficient, which results in a problem of decreased light transmittance attributed to the protrusions. In order to overcome this problem, PSA liquid crystal display devices (polymer sustained alignment, including PS (polymer stabilized) liquid crystal display devices) having a different structure from general MVA liquid crystal display devices have been developed as a technique for giving an even pretilt angle in segmented pixels without formation of protrusions, which are not light-transmissive, in a cell. In production of PSA liquid crystal display devices, a small amount of a polymerizable compound is added to a liquid crystal composition, the liquid crystal composition is introduced into a liquid crystal cell, and then an active energy ray is radiated thereto under application of voltage between electrodes to polymerize the polymerizable compound contained in the liquid crystal composition. A proper pretilt angle can be therefore given in segmented pixels; as a result, increased light transmittance leads to an enhancement in contrast, and giving an even pretilt angle enables high response speed (e.g., see Patent Literature 1). In PSA liquid crystal display devices, however, the addition of a polymerizable compound to a liquid crystal composition causes a problem that defective display such as image sticking is caused in active-matrix liquid crystal display devices in which a high voltage holding ratio is required.

Meanwhile, an increase in the size of the screens of liquid crystal display devices causes a great change in a method for manufacturing liquid crystal display devices. In particular, since typical vacuum injection techniques require much time to be taken in a process for producing large panels, production by an ODF (one-drop-fill) technique has been becoming popular in production of large panels (e.g., see Patent Literature 2).

This technique enables a reduction in time taken for injection as compared with vacuum injection techniques and has therefore become mainstream in manufacturing of liquid crystal display devices. A new problem, however, has arisen, in which droplet stains made by droplets of a liquid crystal composition remain in liquid crystal display devices in the form of landed droplets even after the liquid crystal devices have been completed. The term "droplet stains" is defined as a phenomenon in which white stains of a dropped liquid crystal composition emerge in a black display mode. In general, the occurrence of droplet stains depends on liquid crystal materials to be used in many cases, and the cause of it has been still unclear.

A technique for reducing droplet stains has been disclosed; in this technique, a polymerizable compound contained in a liquid crystal composition is polymerized to form a polymer layer in a liquid crystal composition layer, so that droplet stains generated by an effect of an alignment film can be reduced (e.g., see Patent Literature 3). Such a technique, however, has a problem of image sticking caused by the polymerizable compound added to the liquid crystal composition as in PSA liquid crystal display devices, and the effect on a reduction in droplet stains is insufficient. Hence, development of a liquid crystal display device which retains basic characteristics inherent in liquid crystal display devices and in which image sticking and droplet stains are less likely to be caused are demanded.

CITATION LIST

Patent Literature

PTL 1: Japanese Unexamined Patent Application Publication No. 2002-357830

PTL 2: Japanese Unexamined Patent Application Publication No. 6-235925

PTL 3: Japanese Unexamined Patent Application Publication No. 2006-58755

SUMMARY OF INVENTION

Technical Problem

In view of the above-mentioned circumstances, it is an object of the present invention to provide a liquid crystal display device which enables reductions in image sticking and droplet stains caused in production thereof without degradation of properties such as dielectric anisotropy, viscosity, the upper limit of the temperature of nematic phase, and rotational viscosity ($\gamma_1$) and to provide a method for manufacturing such a liquid crystal display device.

Solution to Problem

In order to achieve the above-mentioned object, the inventors have studied a variety of liquid crystal compositions and a combination of techniques for giving a pretilt angle in a liquid crystal display device and found that the object can be achieved by using specific compounds as liquid crystal molecules in combination without formation of an alignment film on a substrate included in a liquid crystal cell in a technique that involves using two or more polymerizable compounds in a liquid crystal composition, introducing the liquid crystal composition into the liquid crystal cell, and then polymerizing the polymerizable compounds in the liquid crystal composition by irradiation with an active energy ray under application of voltage between electrodes, thereby accomplishing the present invention.

In particular, the present invention provides a liquid crystal display device in which a liquid crystal layer containing a liquid crystal composition is disposed between a first substrate provided with a common electrode and a color filter layer and a second substrate provided with a plurality of pixels each having a pixel electrode, the liquid crystal display device including orientation controlling layers formed of at least two polymerizable compounds and disposed between the first substrate and the liquid crystal layer and between the second substrate and the liquid crystal layer without the presence of an alignment film, wherein each of the pixels has at least two regions having different directions of pretilt, and the liquid crystal composition contains a compound represented by General Formula (I)

[Chem. 1]

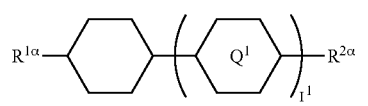
(I)

(where $R^{1\alpha}$ and $R^{2\alpha}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Q^1$ represents a 1,4-phenylene group or a trans-1,4-cyclohexylene group; $l^1$ represents 1 or 2; and in the case where $l^1$ is 2, the two $Q^1$'s may be the same as or different from each other) and a compound represented by General Formula (II)

[Chem. 2]

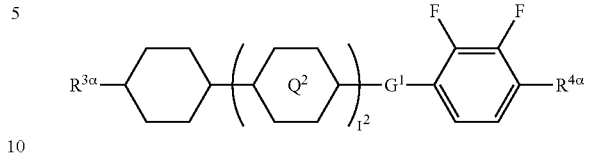
(II)

(where $R^{3\alpha}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{4\alpha}$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; $Q^2$ represents a 1,4-phenylene group or a trans-1,4-cyclohexylene group; $l^2$ represents 0, 1, or 2; in the case where $l^2$ is 2, the two $Q^2$'s may be the same as or different from each other; and $G^1$ is a single bond, —CH$_2$CH$_2$—, —CH$_2$O—, —OCH$_2$—, —CF$_2$O—, or —OCF$_2$—).

The present invention also provides a method for manufacturing a liquid crystal display device in which a liquid crystal layer containing a liquid crystal composition is disposed between a first substrate provided with a common electrode and a color filter layer and a second substrate provided with a plurality of pixels each having a pixel electrode and in which each of the pixels has at least two regions having different directions of pretilt, the method including disposing a liquid-crystal-containing polymerization composition between the first substrate and the second substrate without formation of an alignment film, the liquid-crystal-containing polymerization composition containing a compound represented by General Formula (I)

[Chem. 3]

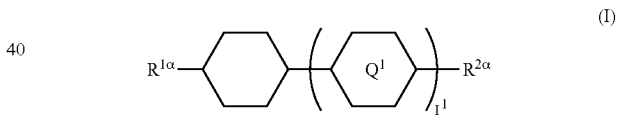
(I)

(where $R^{1\alpha}$ and $R^{2\alpha}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Q^1$ represents a 1,4-phenylene group or a trans-1,4-cyclohexylene group; $l^1$ represents 1 or 2; and in the case where $l^1$ is 2, the two $Q^1$'s may be the same as or different from each other), a compound represented by General Formula (II)

[Chem. 4]

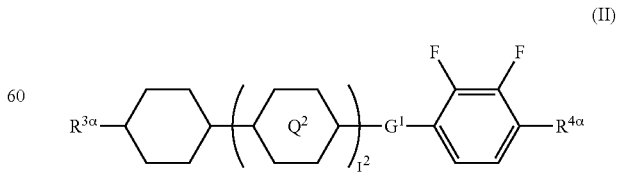
(II)

(where $R^{3\alpha}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{4\alpha}$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; $Q^2$ represents a 1,4-phenylene group or a trans-1,4-cyclohexylene group; $l^2$ represents 0, 1, or 2; in the case where $l^2$ is 2, the two $Q^2$'s may be the same as or different from each other; and $G^1$ is a single bond, —$CH_2CH_2$—, —$CH_2O$—, —$OCH_2$—, —$CF_2O$—, or —$OCF_2$—), and at least two polymerizable compounds; and forming orientation controlling layers between the first substrate and the liquid crystal layer and between the second substrate and the liquid crystal layer by polymerization of the at least two polymerizable compounds with conversion of the liquid-crystal-containing polymerization composition into the liquid crystal composition through irradiation with an active energy ray in a state in which voltage that is for giving a pretilt angle to liquid crystal molecules in the liquid-crystal-containing polymerization composition is applied between the pixel electrode and the common electrode.

Advantageous Effects of Invention

The present invention provides a liquid crystal display device which enables reductions in image sticking and droplet stains caused in production thereof without degradation of properties such as dielectric anisotropy, viscosity, the upper limit of the temperature of nematic phase, and rotational viscosity ($\gamma_1$) and a method for manufacturing such a liquid crystal display device.

DESCRIPTION OF EMBODIMENTS

Embodiments of the liquid crystal display device of the present invention and a method for manufacturing the liquid crystal display device will now be described.

The embodiments are specifically described for better understanding of the gist of the invention, and the present invention is not limited thereto unless otherwise specified.
<Liquid Crystal Display Device>

The liquid crystal display device of the present invention includes a pair of substrates and a liquid crystal layer containing a liquid crystal composition and disposed therebetween and is based on a principle in which the liquid crystal device serves as an optical switch as a result of Freedericksz transition of liquid crystal molecules in the liquid crystal layer due to application of voltage to the liquid crystal layer; in this regard, known techniques can be used.

In general, in a normal vertical-alignment liquid crystal display device in which each of two substrates has an electrode for the Freedericksz transition of liquid crystal molecules, a technique in which electric charge is vertically applied between the substrates is employed. In this case, one of the electrodes is a common electrode, and the other one is a pixel electrode. The most typical embodiment of this structure will now be described.

Figure 1:
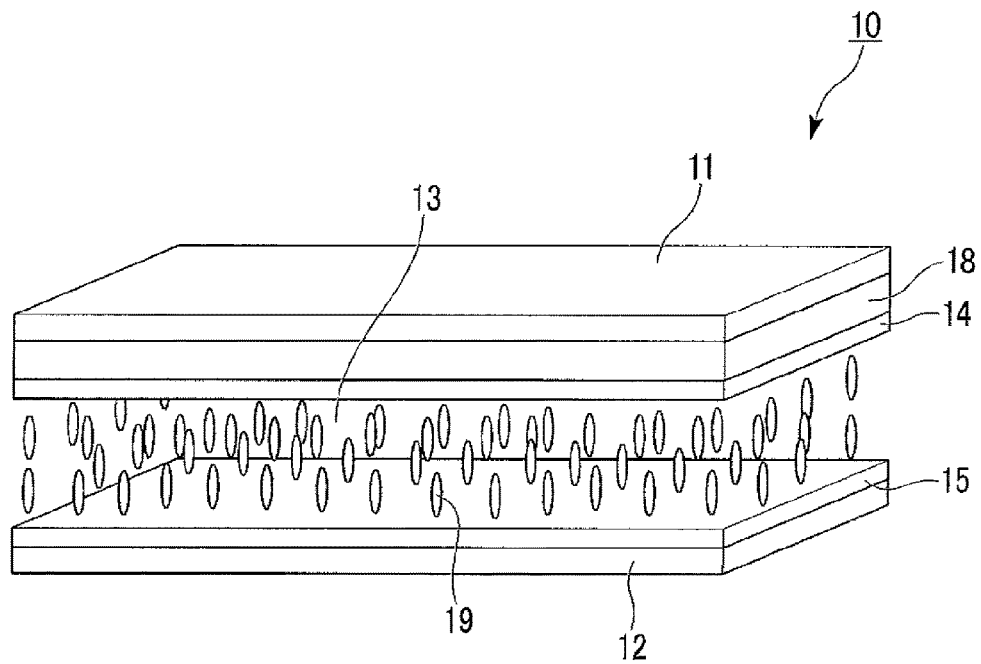
FIG. 1 is a schematic perspective view illustrating an embodiment of the liquid crystal display device of the present invention.

FIG. 1 is a schematic perspective view illustrating one embodiment of the liquid crystal display device of the present invention.

A liquid crystal display device 10 of this embodiment schematically includes a first substrate 11, a second substrate 12, a liquid crystal layer 13 disposed between the first substrate 11 and the second substrate 12 and containing a liquid crystal composition, a common electrode 14 formed on the liquid-crystal-layer-13-side plane of the first substrate 11, pixel electrodes 15 formed on the liquid-crystal-layer-13-side plane of the second substrate 12, and a color filter 18 disposed between the first substrate 11 and the common electrode 14.

The first substrate 11 and the second substrate 12 are, for example, glass substrates or plastic substrates.

Examples of the plastic substrates include substrates made of resins such as an acrylic resin, a methacrylic resin, polyethylene terephthalate, polycarbonate, and a cyclic olefin resin.

In general, each of the common electrode 14 and the pixel electrodes 15 is formed of a transparent material such as indium-added tin oxide (ITO).

The pixel electrodes 15 are disposed on the second substrate 12 in the form of a matrix. The pixel electrodes 15 are each controlled by the drain electrode of an active device typified by a TFT switching device (not illustrated), and the TFT switching device has a gate line as an address signal line and a source line as a data line, each line constituting the matrix structure.

The pixel electrode 15 in each pixel has two or more regions having a difference in the direction of the pretilt of liquid crystal molecules. In this manner, the direction of the pretilt of liquid crystal molecules is defined to segment each pixel into some regions in which the directions of the inclination of liquid crystal molecules are different, so that viewing angle characteristics are enhanced.

In the segmentation of the pixels, for example, a pixel electrode having slits (parts at which electrode is not formed) with a pattern of a stripe, a V shape, or another shape may be provided in each pixel.

Figure 2:
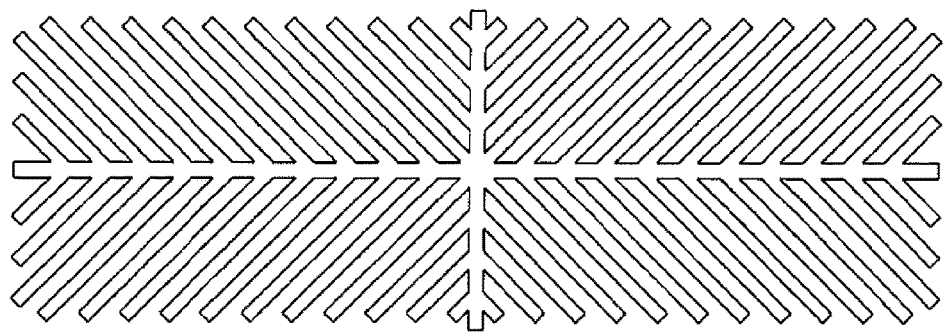
FIG. 2 is a schematic plan view illustrating an example of a slit electrode (comb-shaped electrode) used in the liquid crystal display device of the present invention.

FIG. 2 is a schematic plan view illustrating the typical structure of a slit electrode (comb-shaped electrode) used for segmenting a pixel into four regions. The slit electrode has slits extending from the center of a pixel in four directions in the form of teeth of a comb; hence, application of voltage orients the directors of liquid crystal molecules, which are substantially vertically aligned with respect to the substrate in each pixel in a state in which voltage is not applied, in four different directions, so that the alignment state approaches a horizontal alignment. The liquid crystal molecules in the segments of the pixel can be aligned in different directions as a result, which gives a significantly wide viewing angle.

The liquid crystal display device 10 preferably has a structure in which the pixel electrodes 15 each have slits (slit electrode).

Besides the technique in which the slit electrode is provided, the technique for segmenting the pixels can be a technique in which a structure such as a linear protrusion is formed inside each pixel or a technique in which an electrode other than the pixel electrodes and the common electrode is formed (not illustrated); of these, the technique in which a structure is formed is preferred. The structure may be provided for at least one of the first substrate 11 and the second substrate 12 or both of them.

In view of light transmittance and easy production, the slit electrode is preferably employed. The slit electrode has no driving force to liquid crystal molecules in a state in which voltage is not applied and therefore cannot give liquid crystal molecules a pretilt angle. In the present invention, however, the presence of orientation controlling layers that will be described later enables a pretilt angle to be given; in addition, they are used in combination with the pixel-segmented slit electrode, so that the segmentation of the pixels can make the viewing angle wide.

In the present invention, the expression "having a pretilt angle" refers to the following state; the directions of the directors of liquid crystal molecules are slightly different from a direction vertical to the substrate planes (the adjacent planes of the first and second substrates 11 and 12 to the liquid crystal layer 13) in a state in which voltage is not applied.

Since the liquid crystal display device of the present invention is a vertical-alignment (VA) liquid crystal display device, the directors of liquid crystal molecules are substantially vertical to the substrate planes in a state in which voltage is not applied. In general, in order to vertically align liquid crystal molecules, vertical alignment films made of, for example, polyimide, polyamide, or polysiloxane are disposed between the first substrate and the liquid crystal layer and between the second substrate and the liquid crystal layer; however, the liquid crystal display device of the present invention does not have such alignment films.

In the liquid crystal display device of the present invention, as in the above-mentioned PSA liquid crystal display devices, voltage is applied between the electrodes to slightly tilt liquid crystal molecules, and polymerizable compounds in the liquid crystal composition are polymerized in this state by being irradiated with an active energy ray such as ultraviolet, thereby imparting an adequate pretilt angle. In the liquid crystal display device of the present invention, two or more polymerizable compounds are used in order to form the orientation controlling layers composed thereof.

The expression "liquid crystal molecules are substantially vertically aligned" herein refers to a state in which the directors of vertically aligned liquid crystal molecules are slightly tilted from a vertical direction at a pretilt angle. In the case where liquid crystal molecules are completely vertically aligned, the angle defined by the direction completely parallel to the substrate planes and the directions of the directors of the liquid crystal molecules is 90°; in the case where liquid crystal molecules are completely homogeneously aligned (horizontally aligned with respect to the substrate planes), such an angle is 0°; and in the case where liquid crystal molecules are substantially vertically aligned, the angle is preferably in the range of 89 to 85°, and more preferably 89 to 87°.

The two or more polymerizable compounds may have different structures from each other and preferably includes any of the below first polymerizable compounds and any of the below second polymerizable compounds.

Both of the first polymerizable compounds and the second polymerizable compounds may be used alone or in combination.

Examples of the first polymerizable compounds include compounds each having one polymerizable group and compounds each having two polymerizable groups and an alkylene group positioned therebetween (one or more methylene groups contained in the alkylene group (where the number of the methylene groups is less than the number of the carbon atoms of the alkylene group) are each independently optionally substituted with an oxygen atom, —CO—, —COO—, or —OCO— such that oxygen atoms are not directly bonded to each other).

The first polymerizable compounds are preferably (meth)acrylates; in the case where a compound having one polymerizable group is employed, a monofunctional (meth)acrylate having one (meth)acryloyl group is preferred.

The term "(meth)acrylate" herein refers to both acrylate and methacrylate, and the term "(meth)acryloyl group" similarly refers to both an acryloyl group ($H_2C=CH-CO-$) and a methacryloyl group ($H_2C=C(CH_3)-CO-$).

The terms "—COO—" and "—OCO—" refer to "—C(=O)—O—" and "—O—C(=O)—" unless otherwise specified, respectively.

In particular, the first polymerizable compound is at least one compound selected from the group consisting of compounds represented by General Formula (X1a), compounds represented by General Formula (X1b), and compounds represented by General Formula (X1c).

[Chem. 5]

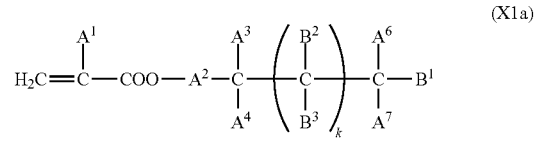

(X1a)

(where $A^1$ represents a hydrogen atom or a methyl group;

$A^2$ represents a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other, and one or more hydrogen atoms contained in the alkylene group are each independently optionally substituted with a fluorine atom, a methyl group, or an ethyl group);

$A^3$ and $A^6$ each independently represent a hydrogen atom, a halogen atom, or an alkyl group having 1 to 18 carbon atoms (one or more methylene groups contained in the alkyl group are each independently optionally substituted with an oxygen atom, —CO—, —COO—, or —OCO— such that oxygen atoms are not directly bonded to each other, and one or more hydrogen atoms contained in the alkyl group are each independently optionally substituted with a halogen atom or an alkyl group having 1 to 17 carbon atoms);

$A^4$ and $A^7$ each independently represent a hydrogen atom, a halogen atom, or an alkyl group having 1 to 10 carbon atoms (one or more methylene groups contained in the alkyl group are each independently optionally substituted with an oxygen atom, —CO—, —COO—, or —OCO— such that oxygen atoms are not directly bonded to each other, and one or more hydrogen atoms contained in the alkyl group are each independently optionally substituted with a halogen atom or an alkyl group having 1 to 9 carbon atoms);

k is from 1 to 40; and $B^1$, $B^2$, and $B^3$ each independently represent a hydrogen atom, a linear or branched alkyl group having 1 to 10 carbon atoms (one or more methylene groups contained in the alkyl group are each independently optionally substituted with an oxygen atom, —CO—, —COO—, or —OCO— such that oxygen atoms are not directly bonded to each other, and one or more hydrogen atoms contained in the alkyl group are each independently optionally substituted with a halogen atom or a trialkoxysilyl group having 3 to 6 carbon atoms), or a group represented by General Formula (I-b)

[Chem. 6]

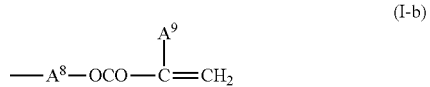

(I-b)

(where $A^9$ represents a hydrogen atom or a methyl group; and
$A^8$ represents a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other, and one or more hydrogen atoms contained in the alkylene group are each independently optionally substituted with a fluorine atom, a methyl group, or an ethyl group), where among $B^1$, $B^2$, and $B^3$ that are present in the number of 2k+1 in total, the number of the groups represented by General Formula (I-b) is 0 or 1)

[Chem. 7]

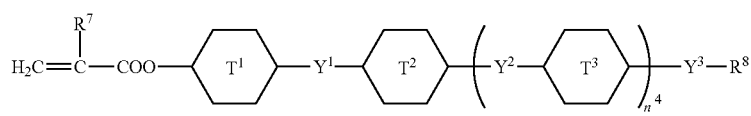

(X1b)

(where $R^7$ represents a hydrogen atom or a methyl group; six-membered rings $T^1$, $T^2$, and $T^3$ each independently represent any of the following structures

[Chem. 8]

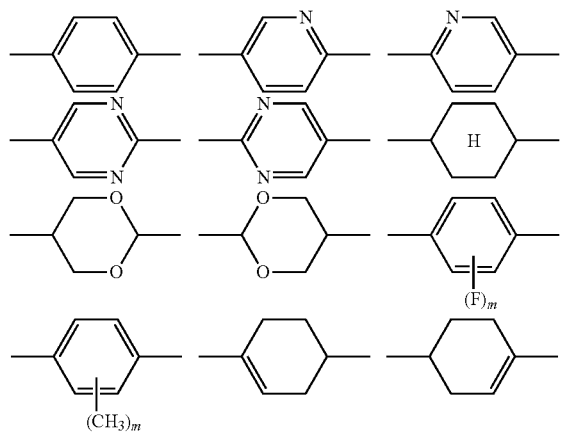

(where m is an integer from 1 to 4);
$n^4$ represents 0 or 1;
$Y^1$ and $Y^2$ each independently represent a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH$_2$=CHCH$_2$CH$_2$—, or —CH$_2$CH$_2$CH=CH—; and $Y^3$ represents a single bond, —COO—, or —OCO—; and
$R^8$ represents a hydrocarbon group having 1 to 18 carbon atoms)

[Chem. 9]

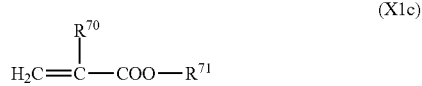

(X1c)

(where $R^{70}$ represents a hydrogen atom or a methyl group, and $R^{71}$ represents a hydrocarbon group having fused rings)

The term "alkylene group" herein refers to a divalent group formed by removal of one hydrogen atom bonded to the carbon atom positioned at each of the two ends of an linear or branched aliphatic hydrocarbon unless otherwise specified; in the case where any of the other hydrogen atoms is substituted with a halogen atom or an alkyl group or where a methylene group is substituted with an oxygen atom, —CO—, —COO—, or —OCO—, such substitution is specified. In addition, the term "alkylene chain length" refers to the following; for example, in the case of a linear alkylene group, n in its general formula "—(CH$_2$)$_n$— (where n is an integer of 1 or more)" is the alkylene chain length.

In General Formula (X1a), alkyl groups having 1 to 18 carbon atoms as $A^3$ and $A^6$ may be linear, branched, or cyclic and are preferably linear or branched; examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-neopentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, a 3-ethylpentyl group, a 2,2,3-trimethylbutyl group, an n-octyl group, an isooctyl group, a nonyl group, a decyl group, an undecyl group, a dodecyl group, a tridecyl group, a tetradecyl group, a pentadecyl group, a hexadecyl group, a heptadecyl group, and an octadecyl group.

Examples of the halogen atoms as $A^3$ and $A^6$ in General Formula (X1a) include a fluorine atom, a chlorine atom, and a bromine atom; and a fluorine atom is preferred.

Examples of the alkyl groups having 1 to 17 carbon atoms, with which hydrogen atoms of the alkyl groups as $A^3$ and $A^6$ are substituted, are the same as the examples of the alkyl groups as $A^3$ and $A^6$ except that the number of carbon atoms is different.

Examples of the halogen atoms, with which hydrogen atoms of the alkyl groups as $A^3$ and $A^6$ are substituted, are the same as the examples of the halogen atoms as $A^3$ and $A^6$.

Examples of the alkylene group having 1 to 15 carbon atoms as $A^2$ in General Formula (X1a) include divalent groups formed by removal of one hydrogen atom from each of the alkyl groups having 1 to 15 carbon atoms as $A^3$ and $A^6$.

Examples of the alkyl groups having 1 to 10 carbon atoms as $A^4$ and $A^7$ in General Formula (X1a) are the same as the examples of the alkyl groups as $A^3$ and $A^6$ except that the number of carbon atoms is different.

Examples of the alkyl group having 1 to 9 carbon atoms, with which hydrogen atoms of the alkyl groups as $A^4$ and $A^7$ are substituted, are the same as the examples of the alkyl groups as $A^3$ and $A^6$ except that the number of carbon atoms is different.

Examples of the halogen atoms, with which hydrogen atoms of the alkyl groups as $A^4$ and $A^7$ are substituted, are the same as examples of the halogen atoms as $A^3$ and $A^6$.

Examples of the linear or branched alkyl groups having 1 to 10 carbon atoms as $B^1$, $B^2$, and $B^3$ in General Formula (X1a) include the same linear or branched alkyl groups having 1 to 10 carbon atoms as the examples of $A^3$ and $A^6$.

Examples of the trialkoxysilyl group having 3 to 6 carbon atoms, with which hydrogen atoms of the alkyl groups as $B^1$, $B^2$, and $B^3$ are substituted, include groups in which a total of three either methoxy groups or ethoxy groups as alkoxy groups are bonded to the same silicon atom; in this case, the three alkoxy groups bonded to the same silicon atom may be all the same as each other, or only two of them may be the same as each other. Specific examples thereof include a trimethoxysilyl group, a triethoxysilyl group, an ethoxydimethoxysilyl group, and a diethoxymethoxysilyl group.

Examples of the halogen atoms, with which hydrogen atoms of the alkyl groups as $B^1$, $B^2$, and $B^3$ are substituted, are the same as the examples of the halogen atoms as $A^3$ and $A^6$.

In General Formula (X1a), $B^1$, $B^2$, and $B^3$ are present in the number of 2k+1 in total; among these, the number of groups represented by General Formula (1-b) is 0 or 1. Any of $B^1$, $B^2$, and $B^3$ can be the group represented by General Formula (1-b); and $B^1$ is preferred.

A preferred compound represented by General Formula (X1a) in which $B^1$, $B^2$, or $B^3$ is the group represented by General Formula (I-b) can be at least one compound selected from the group consisting of compounds represented by General Formula (X1a-1), compounds represented by General Formula (X1a-2), compounds represented by General Formula (X1a-3), and compounds represented by General Formula (X1a-4).

[Chem. 10]

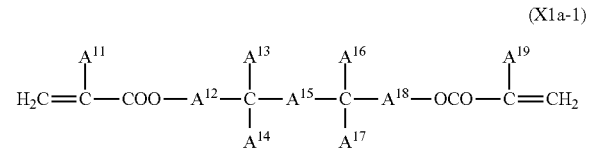

(X1a-1)

(where $A^{11}$ and $A^{19}$ each independently represent a hydrogen atom or a methyl group;
$A^{12}$ and $A^{18}$ each independently represent a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other, and one or more hydrogen atoms contained in the alkylene group are each independently optionally substituted with a fluorine atom, a methyl group, or an ethyl group);
$A^{13}$ and $A^{16}$ each independently represent a linear alkyl group having 2 to 20 carbon atoms (one or more methylene groups contained in the linear alkyl group are each independently optionally substituted with an oxygen atom, —CO—, —COO—, or —OCO— such that oxygen atoms are not directly bonded to each other);
$A^{14}$ and $A^{17}$ each independently represent a hydrogen atom or an alkyl group having 1 to 10 carbon atoms (one or more methylene groups contained in the alkyl group are each independently optionally substituted with an oxygen atom, —CO—, —COO—, or —OCO— such that oxygen atoms are not directly bonded to each other, and one or more hydrogen atoms contained in the alkyl group are each independently optionally substituted with a halogen atom or an alkyl group having 1 to 9 carbon atoms); and
$A^{15}$ represents an alkylene group having 9 to 16 carbon atoms (in at least 1 to 5 methylene groups contained in the alkylene group, one hydrogen atom of each of the methylene groups is independently optionally substituted with a linear or branched alkyl group having 1 to 10 carbon atoms, and one or more methylene groups contained in the alkylene group are each independently optionally substituted with an oxygen atom, —CO—, —COO—, or —OCO— such that oxygen atoms are not directly bonded to each other

[Chem. 11]

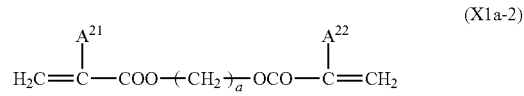

(X1a-2)

(where $A^{21}$ and $A^{22}$ each independently represent a hydrogen atom or a methyl group, and a is an integer from 6 to 22)

[Chem. 12]

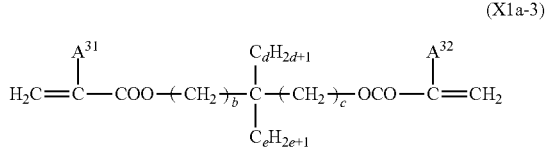

(X1a-3)

(where $A^{31}$ and $A^{32}$ each independently represent a hydrogen atom or a methyl group; b, c, and d each independently represent an integer from 1 to 10; and e represents an integer from 0 to 6)

[Chem. 13]

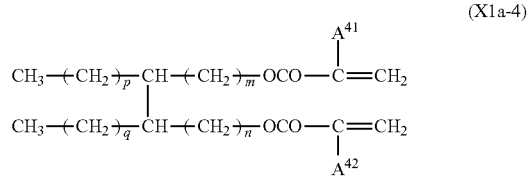

(X1a-4)

(where $A^{41}$ and $A^{42}$ each independently represent a hydrogen atom or a methyl group; and m, n, p, and q each independently represent an integer from 1 to 10)

Examples of the linear alkyl groups having 2 to 20 carbon atoms as $A^{13}$ and $A^{16}$ in General Formula (X1a-1) include the same linear alkyl groups as the examples of $A^3$ and $A^6$, a nonadecyl group, and an icosyl group.

Examples of the alkyl groups having 1 to 10 carbon atoms as $A^{14}$ and $A^{17}$ in General Formula (X1a-1) are the same as examples of the alkyl groups as $A^3$ and $A^6$ except that the number of carbon atoms is different.

Examples of the alkylene groups having 1 to 15 carbon atoms as $A^{12}$ and $A^{18}$ in General Formula (X1a-1) are the same as the examples of the alkylene groups as $A^2$.

Examples of the alkylene groups having 9 to 16 carbon atoms as $A^{15}$ in General Formula (X1a-1) include divalent groups formed by removal of one hydrogen atom from the alkyl groups having 9 to 16 carbon atoms as $A^3$ and $A^6$.

Examples of the alkyl groups having 1 to 9 carbon atoms, with which hydrogen atoms of the alkyl groups as $A^{14}$ and $A^{17}$ are substituted, and examples of the linear or branched alkyl group having 1 to 10 carbon atoms, with which a hydrogen atom of the alkylene group as $A^{15}$ is substituted, are the same as the examples of the alkyl groups as $A^3$ and $A^6$ except that the number of carbon atoms is different.

Examples of the halogen atoms, with which hydrogen atoms of the alkyl groups as $A^{14}$ and $A^{17}$ are substituted, are the same as the examples of the halogen atoms as $A^3$ and $A^6$.

Among compounds represented by General Formula (X1a-1), a compound in which each of $A^{11}$ and $A^{19}$ represents a hydrogen atom is preferred rather than a compound in which each of $A^{11}$ and $A^{19}$ represents a methyl group because the former has a higher rate of polymerization.

Among compounds represented by General Formula (X1a-1), a compound in which $A^{12}$ and $A^{18}$ each independently represent a single bond or an alkylene group having 1 to 3 carbon atoms is preferred. The distance between the two polymerizable groups can be adjusted by independently changing the number of carbon atoms in the chain of each of $A^{12}$, $A^{18}$, and $A^{15}$. The compound represented by General Formula (X1a-1) is characterized in that the distance between the polymerizable groups (distance between crosslinking points) is long; however, if this distance is too long, the rate of polymerization becomes extremely low, which adversely affects phase separation. Hence, the distance between the polymerizable groups has an upper limit. In addition, the distance between the two side chains $A^{13}$ and $A^{16}$ has an effect on the mobility of the main chain. In particular, if the distance between the side chains $A^{13}$ and $A^{16}$ is short, $A^{13}$ and $A^{16}$ interfere with each other, which results in a decrease in the mobility. Thus, in the compound represented by General Formula (X1a-1), the distance between the polymerizable groups is determined by the sum of $A^{12}$, $A^{18}$, and $A^{15}$, and elongating $A^{15}$ is preferred rather than elongating $A^{12}$ and $A^{18}$.

In the side chains $A^{13}$, $A^{14}$, $A^{16}$, and $A^{17}$, the lengths thereof are preferably as follows.

In General Formula (X1a-1), $A^{13}$ and $A^{14}$ are bonded to the same carbon atom on the main chain; in the case where these side chains have different lengths, the longer side chain is defined as $A^{13}$ (in the case where $A^{13}$ and $A^{14}$ have the same length, either one of them is defined as $A^{13}$). Similarly, in the case where the side chains $A^{16}$ and $A^{17}$ have different lengths, the longer side chain is defined as $A^{16}$ (in the case where $A^{16}$ and $A^{17}$ have the same length, either one of them is defined as $A^{16}$).

In the present invention, such $A^{13}$ and $A^{16}$ each independently represent a linear alkyl group having 2 to 20 carbon atoms (one or more methylene groups contained in the linear alkyl group are each independently optionally substituted with an oxygen atom, —CO—, —COO—, or —OCO— such that oxygen atoms are not directly bonded to each other); preferably each independently represent a linear alkyl group having 2 to 18 carbon atoms (one or more methylene groups contained in the linear alkyl group are each independently optionally substituted with an oxygen atom, —CO—, —COO—, or —OCO— such that oxygen atoms are not directly bonded to each other); and more preferably each independently represent a linear alkyl group having 3 to 15 carbon atoms (one or more methylene groups contained in the linear alkyl group are each independently optionally substituted with an oxygen atom, —CO—, —COO—, or —OCO— such that oxygen atoms are not directly bonded to each other).

Since side chains have a higher mobility than the main chain, the presence thereof contributes to an enhancement in the mobility of the polymer chain at low temperature; however, the mobility is decreased in the case where spatial interference occurs between two side chains as described above. In order to prevent such spatial interference between two side chains, it is effective to elongate the distance between the side chains and to decrease the lengths of the side chains to the necessary extent.

In the present invention, $A^{14}$ and $A^{17}$ each independently represent a hydrogen atom or an alkyl group having 1 to 10 carbon atoms (one or more methylene groups present in the alkyl group are each independently optionally substituted with an oxygen atom, —CO—, —COO—, or —OCO— such that oxygen atoms are not directly bonded to each other, and one or more hydrogen atoms present in the alkyl group are each independently optionally substituted with a halogen atom or an alkyl group having 1 to 9 carbon atoms); preferably each independently represent a hydrogen atom or an alkyl group having 1 to 7 carbon atoms (one or more methylene groups present in the alkyl group are each independently optionally substituted with an oxygen atom, —CO—, —COO—, or —OCO— such that oxygen atoms are not directly bonded to each other); more preferably each independently represent a hydrogen atom or an alkyl group having 1 to 5 carbon atoms (one or more methylene groups present in the alkyl group are each independently optionally substituted with an oxygen atom, —CO—, —COO—, or —OCO— such that oxygen atoms are not directly bonded to each other); and further preferably each independently represent a hydrogen atom or an alkyl group having 1 to 3 carbon atoms (one or more methylene groups present in the alkyl group are each independently optionally substituted with an oxygen atom, —CO—, —COO—, or —OCO— such that oxygen atoms are not directly bonded to each other).

Likewise, the extraordinary lengths of $A^{14}$ and $A^{17}$ induce the spatial interference between the side chains and are therefore not preferred. In the case where $A^{14}$ and $A^{17}$ are short alkyl chains, it is believed that they can be side chains having a high mobility and serve to inhibit the approach of adjacent main chains to each other. It is assumed that an effect of preventing the interference between polymer main chains enhances the mobility of the main chains, so that an increase in anchoring energy at low temperature can be reduced; thus, it is effective to improve the display characteristics of a polymer stabilized liquid crystal display device in a low-temperature range.

$A^{15}$ positioned between the two side chains is preferably long in terms of both a change in the distance between the side chains and an increase in the distance between the crosslinking points for a decrease in glass transition point. In the case where $A^{15}$ is extraordinarily long, the molecular weight of the compound represented by General Formula (X1a-1) becomes too large with the result that solubility in the liquid crystal composition is reduced, and the rate of polymerization becomes too slow with the result that phase separation is adversely affected; for these reasons, the length eventually has an upper limit.

Accordingly, $A^{15}$ preferably represents an alkylene group having 9 to 16 carbon atoms (in at least 1 to 5 methylene groups contained in the alkylene group, one hydrogen atom of each methylene group is independently optionally substituted with a linear or branched alkyl group having 1 to 10 carbon atoms, and one or more methylene groups contained in the alkylene group are each independently optionally substituted with an oxygen atom, —CO—, —COO—, or —OCO— such that oxygen atoms are not directly bonded to each other).

In particular, the alkylene chain length of $A^{15}$ is preferably 9 to 16 carbon atoms. In the case where a hydrogen atom contained in the alkylene group as $A^{15}$ is substituted with an alkyl group having 1 to 10 carbon atoms, the number of the alkyl groups for the substitution is preferably from 1 to 5, more preferably 1 to 3, and further preferably 2 or 3. The substituent alkyl group preferably has 1 to 5 carbon atoms, and more preferably 1 to 3 carbon atoms.

The compound represented by General Formula (X1a-1) can be produced by known techniques described in, for instance, *Tetrahedron Letters*. Vol. 30, pp 4985; *Tetrahedron Letters*. Vol. 23, No. 6, pp 681-684; and Journal of Polymer Science. Part A. *Polymer Chemistry*. Vol. 34, pp 217-225.

A compound, for example, represented by General Formula (X1a-1) in which each of $A^{14}$ and $A^{17}$ is a hydrogen atom can be obtained as follows: a compound having multiple epoxy groups is allowed to react with a polymerizable compound having active hydrogen that can react with the epoxy groups, such as acrylic acid or methacrylic acid, to synthesize a polymerizable compound having hydroxyl groups, and then the polymerizable compound is allowed to react with a saturated fatty acid.

Such a compound is also obtained as follows: a compound having multiple epoxy groups is allowed to react with a saturated fatty acid to synthesize a compound having hydroxyl groups, and then this compound is allowed to react with a polymerizable compound having groups which can react with the hydroxyl groups, such as acrylic acid chloride.

In the case where a radically polymerizable compound is, for instance, represented by General Formula (X1a-1) in which each of $A^{14}$ and $A^{17}$ is an alkyl group and in which each of $A^{12}$ and $A^{18}$ is a methylene group having one carbon atom, this compound can be obtained by the following technique: a technique involving the reaction of a compound having multiple oxetane groups with a fatty acid chloride or fatty acid which can react with the oxetane groups and the further reaction with a polymerizable compound having active hydrogen, such as acrylic acid, or a technique involving the reaction of a compound having one oxetane group with a polyvalent fatty acid chloride or fatty acid which can react with the oxetane group and the further reaction with a polymerizable compound having active hydrogen, such as acrylic acid.

In the case where each of $A^{12}$ and $A^{18}$ in General Formula (X1a-1) is an alkylene group having three carbon atoms (propylene group, —CH$_2$CH$_2$CH$_2$—), such a compound can be obtained by using a compound having multiple furan groups instead of oxetane groups. In the case where each of $A^{12}$ and $A^{18}$ in General Formula (X1a-1) is an alkylene group having four carbon atoms (butylene group, —CH$_2$CH$_2$CH$_2$CH$_2$—), such a compound can be obtained by using a compound having multiple pyran groups instead of oxetane groups.

Among compounds represented by General Formula (X1a-1), which can be obtained in this manner, a compound represented by General Formula (X1a-1-1) is particularly preferred.

[Chem. 14]

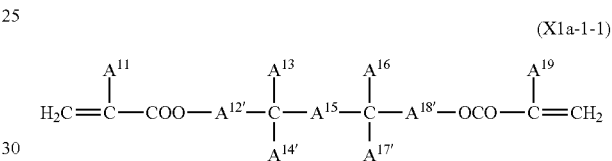

(X1a-1-1)

(where $A^{11}$ and $A^{19}$ each independently represent a hydrogen atom or a methyl group;

$A^{12'}$ and $A^{18'}$ each represent a methylene group;

$A^{13}$ and $A^{16}$ each independently represent a linear alkyl group having 2 to 20 carbon atoms (one or more methylene groups contained in the linear alkyl group are each independently optionally substituted with an oxygen atom, —CO—, —COO—, or —OCO— such that oxygen atoms are not directly bonded to each other);

$A^{14'}$ and $A^{17'}$ each independently represent an alkyl group having 1 to 10 carbon atoms; and $A^{15}$ represents an alkylene group having 9 to 16 carbon atoms (in at least 1 to 5 methylene groups contained in the alkylene group, one hydrogen atom of each methylene group is independently optionally substituted with a linear or branched alkyl group having 1 to 10 carbon atoms, and one or more methylene groups contained in the alkylene group are each independently optionally substituted with an oxygen atom, —CO—, —COO—, or —OCO— such that oxygen atoms are not directly bonded to each other)

Examples of the alkyl groups as $A^{14'}$ and $A^{17'}$ are the same as the examples of the alkyl groups as $A^{14}$ and $A^{17}$.

A compound represented by General Formula (X1a-1-1) in which the total number of —COO— and —OCO— in $A^{15}$ is not more than two and in which the number of each of —COO— and —OCO— in $A^{13}$ and $A^{16}$ is not more than one is particularly preferred; specific examples of such a compound include compounds represented by Formulae (X1a-101) to (X1a-109)

[Chem. 15]
(X1a-101)
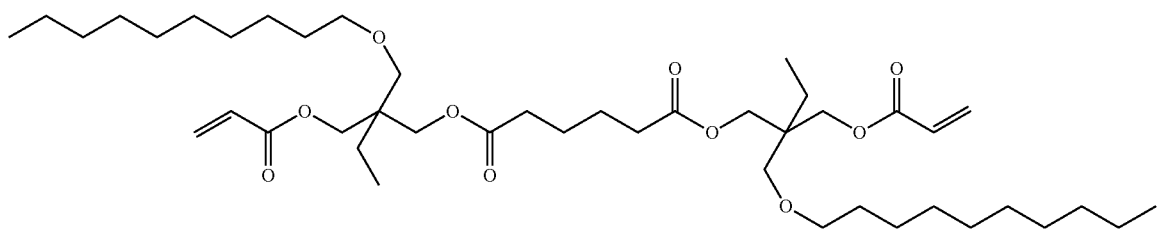
(X1a-102)
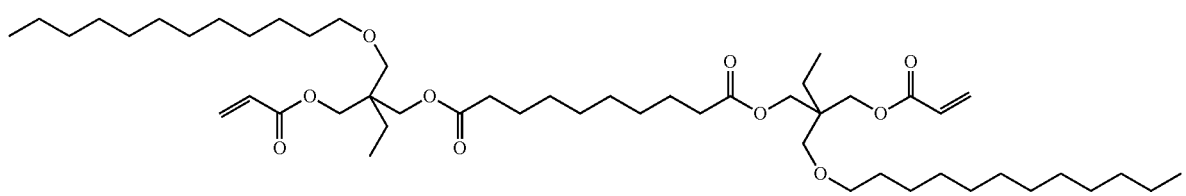
(X1a-103)
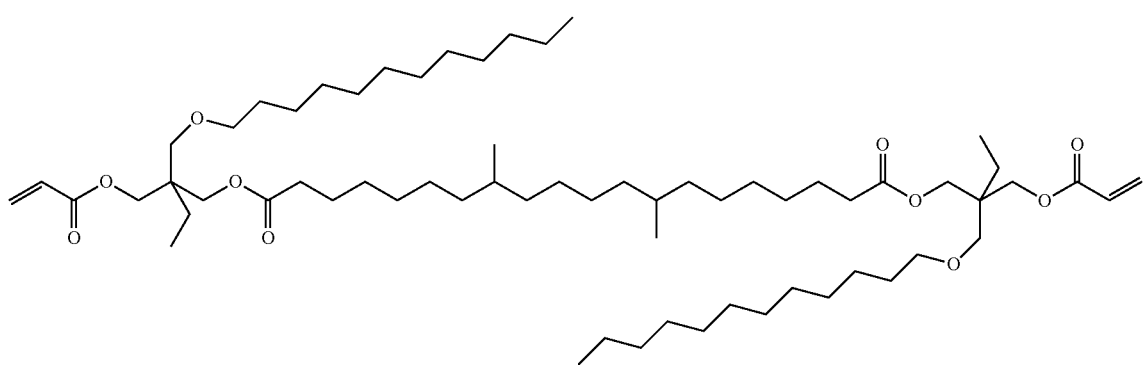
(X1a-104)
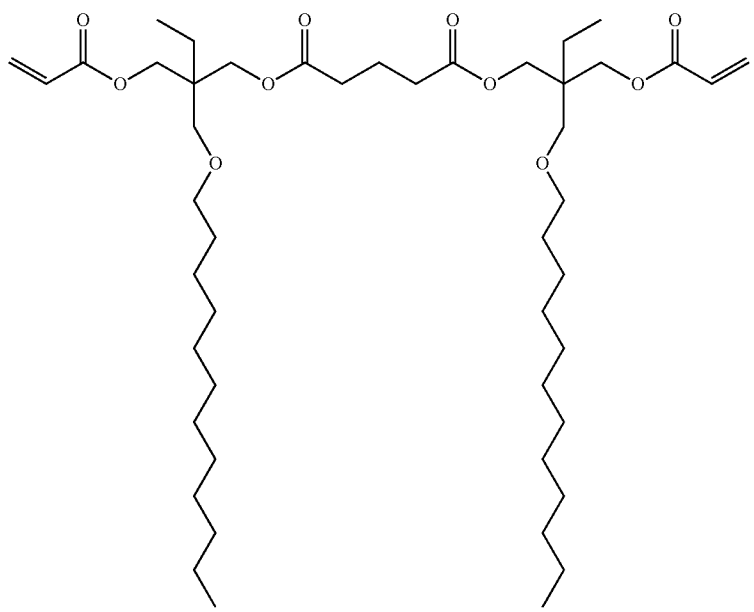

-continued

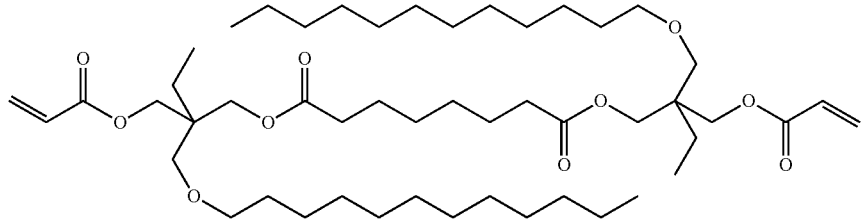
(X1a-105)

[Chem. 16]

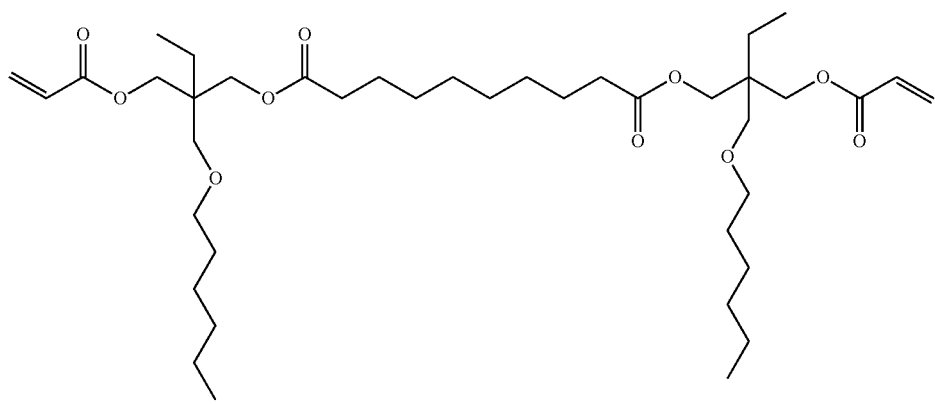
(X1a-106)

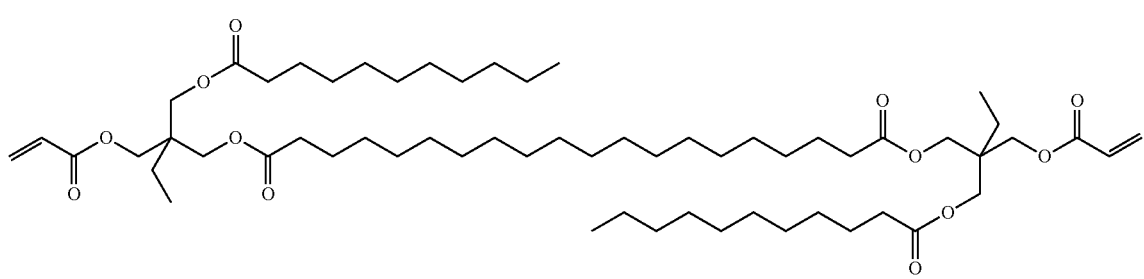
(X1a-107)

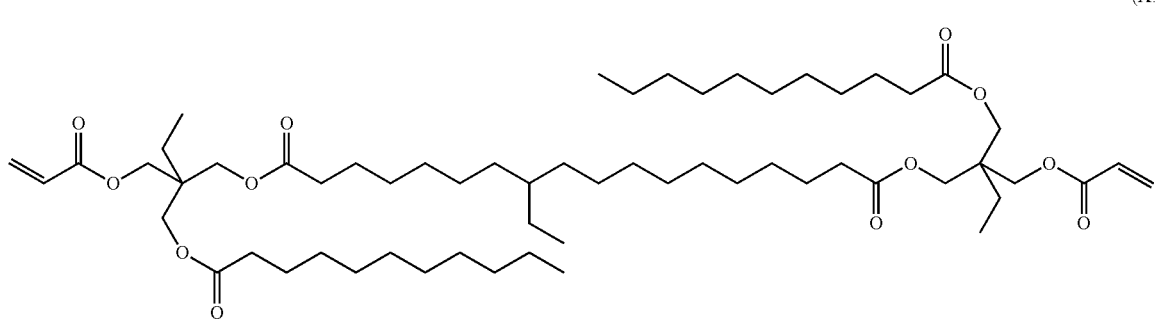
(X1a-108)

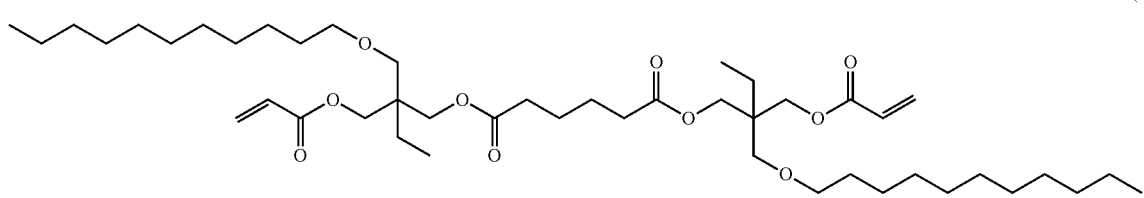
(X1a-109)

In General Formula (X1b), the hydrocarbon group having 1 to 18 carbon atoms as $R^8$ may be either of an aliphatic hydrocarbon group and an aromatic hydrocarbon group, and the aliphatic hydrocarbon group may be linear, branched, or cyclic and may be saturated or unsaturated. If the hydrocarbon group is cyclic, it may be monocyclic or polycyclic.

In particular, the hydrocarbon group having 1 to 18 carbon atoms as $R^8$ is preferably an aliphatic hydrocarbon group, and more preferably a saturated aliphatic hydrocarbon group; examples thereof are the same as the examples of the alkyl group having 1 to 18 carbon atoms as $A^3$ and $A^6$, and $R^8$ is especially preferably a linear or branched saturated aliphatic hydrocarbon group.

Preferred examples of the compound represented by General Formula (X1b) include compounds in which each of six-membered rings $T^1$, $T^2$, and $T^3$ is a hydrocarbon ring.

In a compound represented by General Formula (X1c), the hydrocarbon group as $R^{71}$ may be any hydrocarbon group provided that it has fused rings; it may consist of only fused rings or have both fused rings and another hydrocarbon group.

The fused rings may be either of aliphatic rings and aromatic rings. The aliphatic rings may be either of saturated aliphatic rings and unsaturated aliphatic rings or may have both a saturated aliphatic ring and an unsaturated aliphatic ring. The number of rings contained in the fused rings may be two or more and is preferably from two to seven.

A hydrocarbon group other than the fused rings may be either linear, branched, or cyclic or may have both a chain structure (straight chain and/or branched chain) and a cyclic structure. A hydrocarbon group both having a chain structure and a cyclic structure may be either of a saturated hydrocarbon group and an unsaturated hydrocarbon group, and a hydrocarbon group having a cyclic structure may be either of an alicyclic hydrocarbon group and an aromatic hydrocarbon group.

Preferred examples of $R^{71}$ include monovalent groups formed by eliminating one hydrogen atom from steroids, and a monovalent group formed by eliminating one hydroxyl group from cholesterol is preferred.

The second polymerizable compound is, for example, preferably a compound having two polymerizable groups but not corresponding to the first polymerizable compound.

The second polymerizable compound is preferably (meth)acrylate and also preferably bifunctional (meth)acrylate having two (meth)acryloyl groups.

In particular, the second polymerizable compound is preferably at least one compound selected from the group consisting of compounds represented by General Formula (X2a).

[Chem. 17]

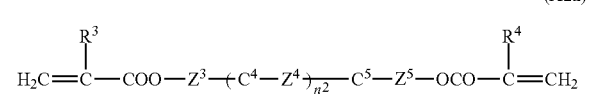

(X2a)

(where $R^3$ and $R^4$ each independently represent a hydrogen atom or a methyl group;

$C^4$ and $C^5$ each independently represent a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a phenanthrene-2,7-diyl group, an anthracene-2,6-diyl group, a 2,6-naphthylene group, or an indane-2,5-diyl group (among these groups, one or more hydrogen atoms of the 1,4-phenylene group, 1,2,3,4-tetrahydronaphthalen-2,6-diyl group, 2,6-naphthylene group, and indane-2,5-diyl group are each independently optionally substituted with a fluorine atom, a chlorine atom, a methyl group, a trifluoromethyl group, or a trifluoromethoxy group);

$Z^3$ and $Z^5$ each independently represent a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other, and one or more hydrogen atoms contained in the alkylene group are each independently optionally substituted with a fluorine atom, a methyl group, or an ethyl group);

$Z^4$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —CH=CHCOO—, —OCOCH=CH—, —COO—, or —OCO—;

$n^2$ represents 0, 1, or 2; and in the case where $n^2$ is 2, multiple $C^4$'s may be the same as or different from each other, and multiple $Z^4$'s may be the same as or different from each other)

In General Formula (X2a), examples of the alkylene group having 1 to 15 carbon atoms as $Z^3$ and $Z^5$ include divalent groups formed by removal of one hydrogen atom from the alkyl group having 1 to 15 carbon atoms as $A^3$ and $A^6$.

Preferred examples of the second polymerizable compound include compounds represented by Formulae (X2a-101) to (X2a-140).

[Chem. 18]

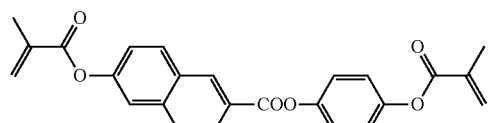

(X2a-101)

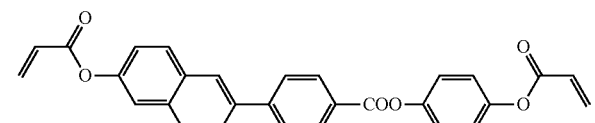

(X2a-102)

-continued
(X2a-103)
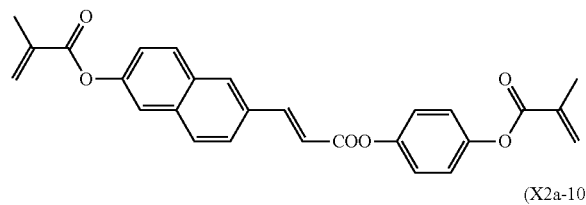
(X2a-104)
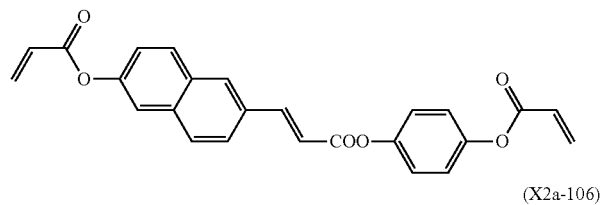
(X2a-105)
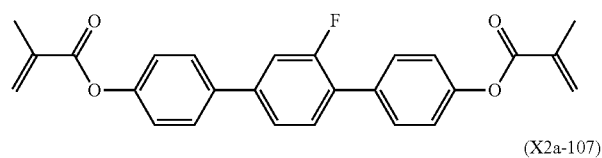
(X2a-106)
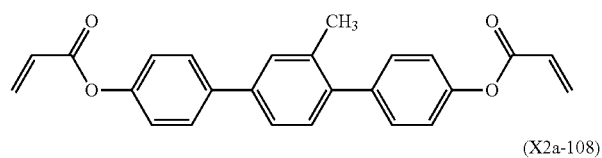
(X2a-107)
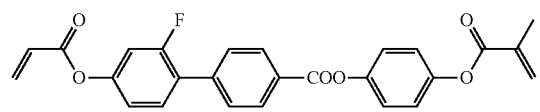
(X2a-108)
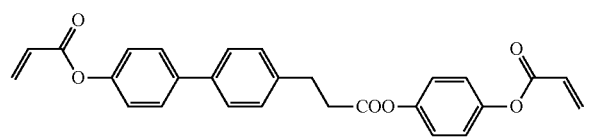
(X2a-109)
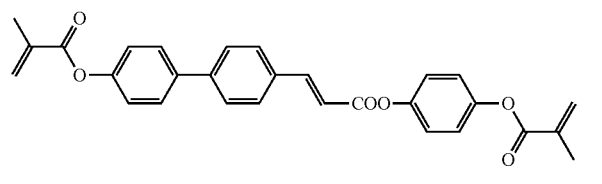
(X2a-110)
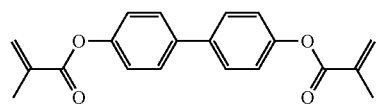
(X2a-111)
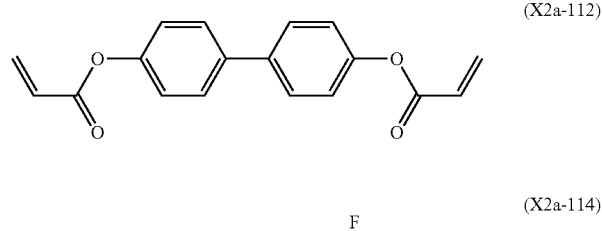
(X2a-112)
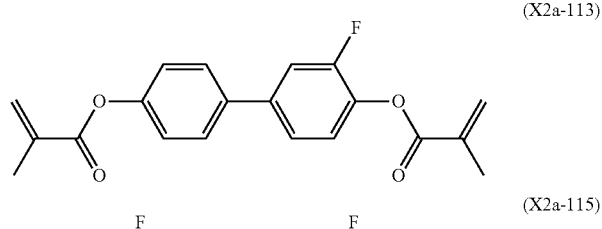
(X2a-113)
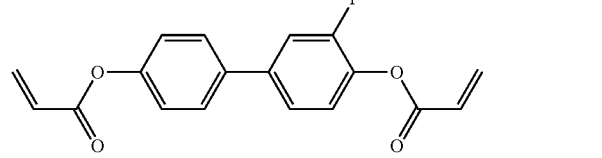
(X2a-114)
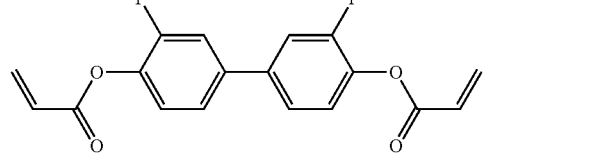
(X2a-115)
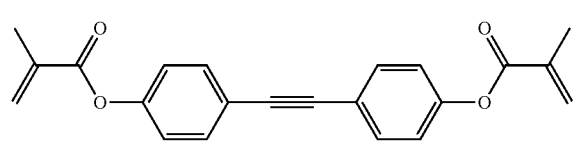
[Chem. 19]
(X2a-117)
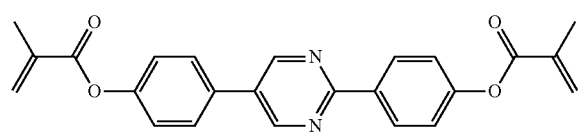
(X2a-118)
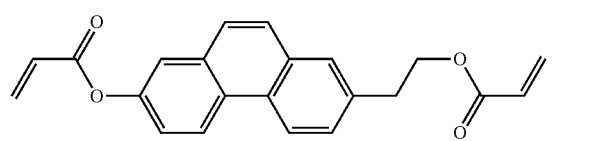

-continued
(X2a-119) 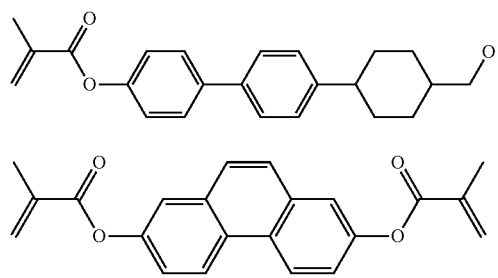
(X2a-120) 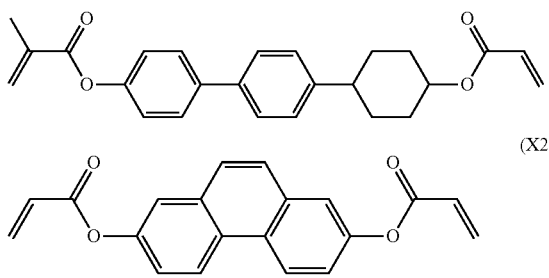
(X2a-121) 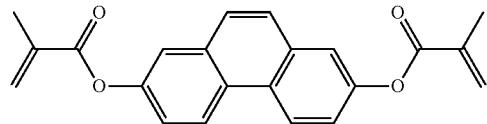
(X2a-122) 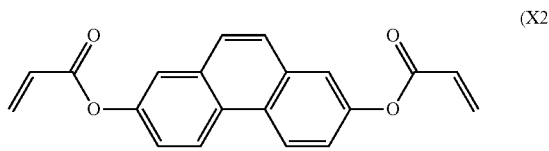
(X2a-123) 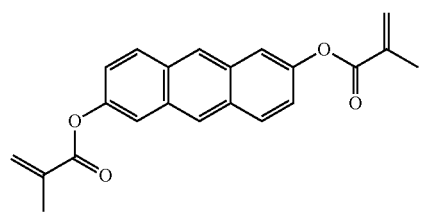
(X2a-124) 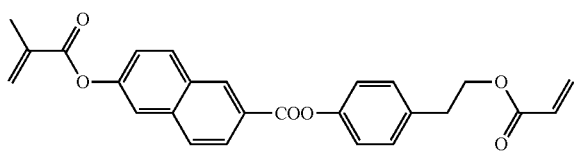
(X2a-125) 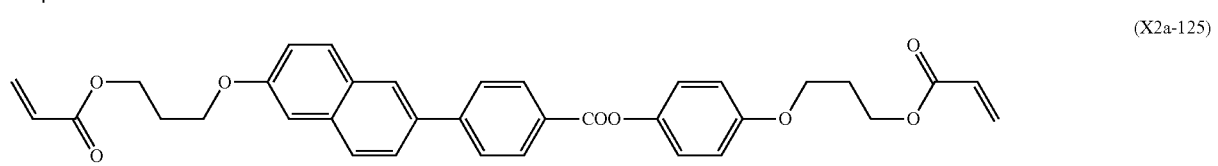
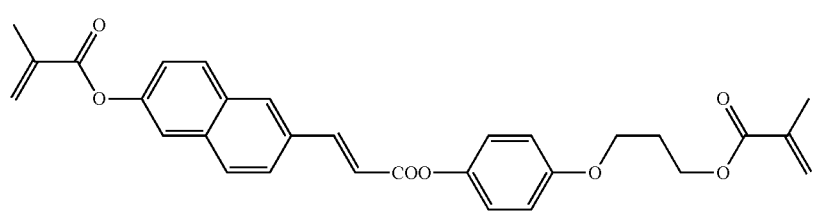
(X2a-126) 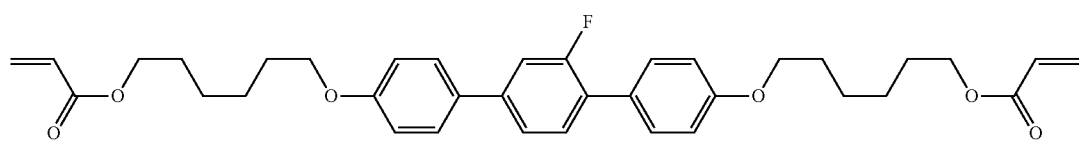
(X2a-127) 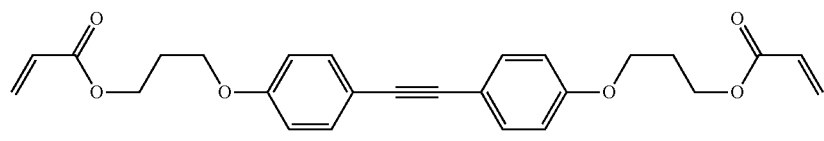
(X2a-128) 
(X2a-129) 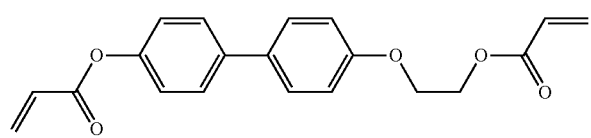
(X2a-130)
(X2a-131)
(X2a-132) 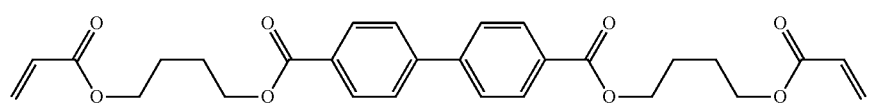

-continued

[Chem. 20]

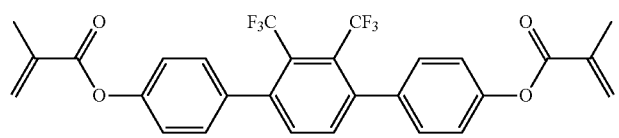
(X2a-133)

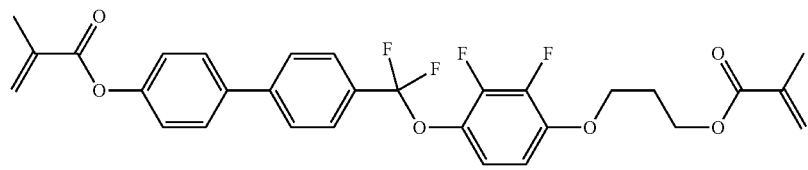
(X2a-134)

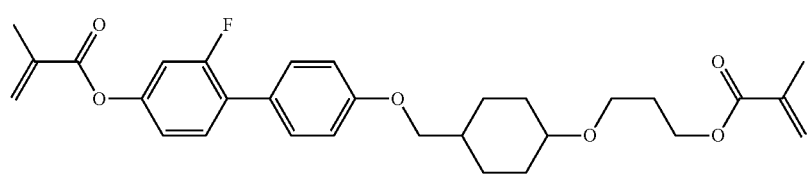
(X2a-135)

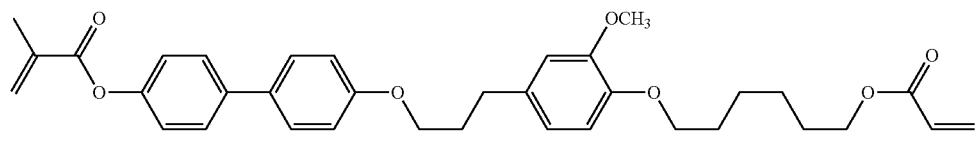
(X2a-136)

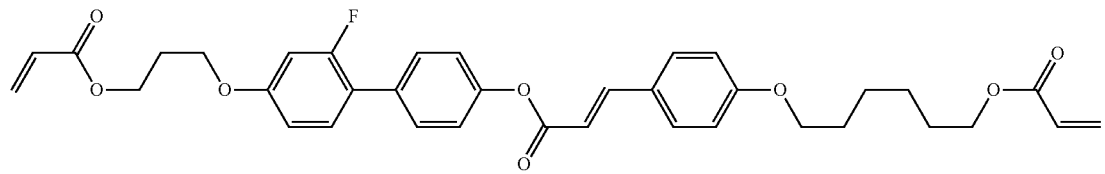
(X2a-137)

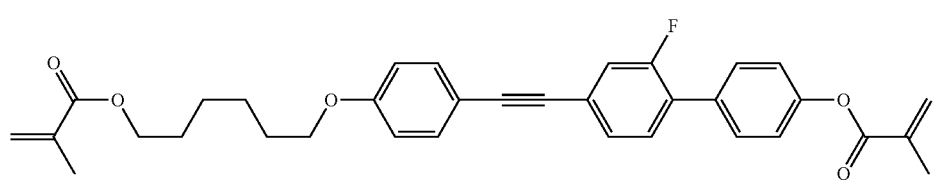
(X2a-138)

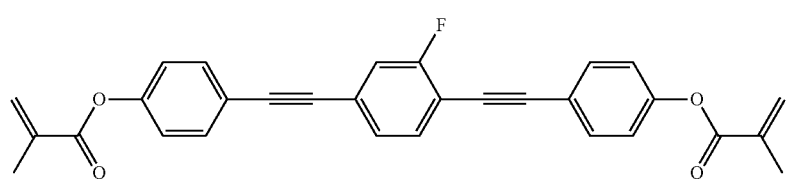
(X2a-139)

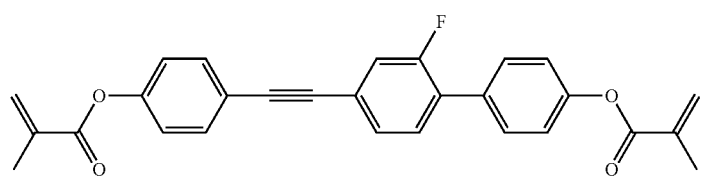
(X2a-140)

Two or more of the polymerizable compounds may be used for forming the orientation controlling layers; two to four of the compounds are preferably used, two or three of the compounds are more preferably used, and two of the compounds are especially preferably used because they give a stronger effect that droplet stains are less likely to occur in production of liquid crystal display devices without degradation of properties inherent in liquid crystal display devices and image sticking properties of liquid crystal display devices.

The content percentage of each of the polymerizable compounds used for forming the orientation controlling layers may be appropriately adjusted on the basis of the number of types of polymerizable compounds to be used; the content percentage is preferably in the range of 10 to 90 mass %, and more preferably 14 to 86 mass % relative to the total amount of the polymerizable compounds used.

In particular, in the case where only one first polymerizable compound and one second polymerizable compound are used for forming the orientation controlling layer, the amount of the first polymerizable compound is preferably 1 to 8 times, and more preferably 1.5 to 6 times the amount of the second polymerizable compound on a mass basis.

The liquid crystal composition contains a compound represented by General Formula (I) and a compound represented by General Formula (II).

[Chem. 21]

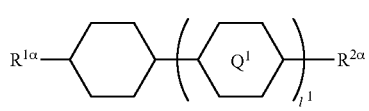
(I)

(where $R^{1\alpha}$ and $R^{2\alpha}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Q^1$ represents a 1,4-phenylene group or a trans-1,4-cyclohexylene group; $l^1$ represents 1 or 2; and in the case where $l^1$ is 2, the two $Q^1$'s may be the same as or different from each other)

[Chem. 22]

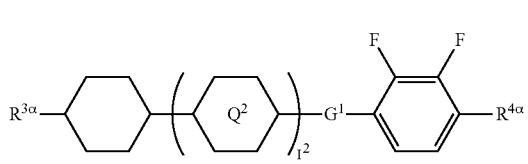
(II)

(where $R^{3\alpha}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{4\alpha}$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; $Q^2$ represents a 1,4-phenylene group or a trans-1,4-cyclohexylene group; $l^2$ represents 0, 1, or 2; in the case where $l^2$ is 2, the two $Q^2$'s may be the same as or different from each other; and $G^1$ is a single bond, —CH$_2$CH$_2$—, —CH$_2$O—, —OCH$_2$—, —CF$_2$O—, or —OCF$_2$—)

In General Formula (I), the alkyl group having 1 to 8 carbon atoms as each of $R^{1\alpha}$ and $R^{2\alpha}$ may be linear, branched, or cyclic and is preferably linear or branched; examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, a 3-ethylpentyl group, a 2,2,3-trimethylbutyl group, an n-octyl group, and an isooctyl group.

The alkyl group as each of $R^{1\alpha}$ and $R^{2\alpha}$ preferably has one to six carbon atoms.

Examples of the alkenyl group having 2 to 8 carbon atoms as each of $R^{1\alpha}$ and $R^{2\alpha}$ in General Formula (I) include monovalent groups formed by substituting one single bond (C—C) between carbon atoms in the alkyl groups having 2 to 8 carbon atoms as $R^{1\alpha}$ and $R^{2\alpha}$ with a double bond (C=C), such as an ethenyl group (vinyl group) and a 2-propenyl group (allyl group).

The alkenyl group as each of $R^{1\alpha}$ and $R^{2\alpha}$ preferably has two to six carbon atoms and more preferably has any of the following structures.

[Chem. 23]

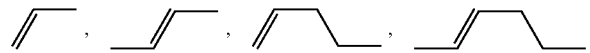

(where in each of the alkenyl groups, the oxygen atom at the right end is bonded to the ring structure)

In General Formula (I), examples of the alkoxy group having 1 to 8 carbon atoms as each of $R^{1\alpha}$ and $R^{2\alpha}$ include monovalent groups formed by bonding of an alkyl groups having 1 to 8 carbon atoms as $R^{1\alpha}$ and $R^{2\alpha}$ to an oxygen atom, such as a methoxy group and an ethoxy group.

The alkoxy group as each of $R^{1\alpha}$ and $R^{2\alpha}$ preferably has one to six carbon atoms, more preferably one to five carbon atoms, and especially preferably one to three carbon atoms.

In General Formula (I), examples of the alkenyloxy group having 2 to 8 carbon atoms as each of $R^{1\alpha}$ and $R^{2\alpha}$ include monovalent groups formed by bonding of the alkenyl group having 2 to 8 carbon atoms as $R^{1\alpha}$ and $R^{2\alpha}$ to an oxygen atom, such as an ethenyloxy group and a 2-propenyloxy group.

The alkenyloxy group as each of $R^{1\alpha}$ and $R^{2\alpha}$ preferably has two to six carbon atoms.

Preferred examples of the compound represented by General Formula (I) include compounds in which $R^{1\alpha}$ and $R^{2\alpha}$ are a combination of the alkyl groups, the alkyl group and the alkoxy group, or the alkyl group and the alkenyl group.

Furthermore, preferred examples of the compound represented by General Formula (I) include compounds represented by General Formulae (I-1) to (I-4).

[Chem. 24]

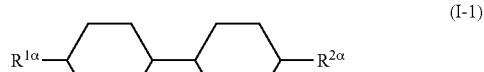
(I-1)

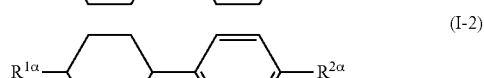
(I-2)

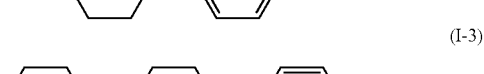
(I-3)

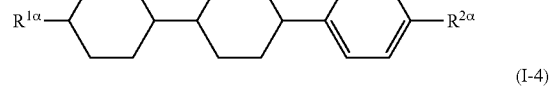
(I-4)

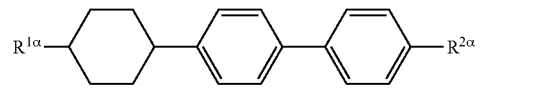

(where $R^{1\alpha}$ and $R^{2\alpha}$ are the same as described above)

The amount of the compound represented by General Formula (I) in the liquid crystal composition is preferably in the range of 30 to 65 mass %, and more preferably 35 to 55 mass %.

In General Formula (II), $R^{3\alpha}$ has the same meaning as each of $R^{1\alpha}$ and $R^{2\alpha}$.

In General Formula (II), examples of the alkyl group and alkoxy group each having 1 to 8 carbon atoms as $R^{4\alpha}$ are the same as the examples of the alkyl group and alkoxy group each having 1 to 8 carbon atoms as each of $R^{1\alpha}$ and $R^{2\alpha}$.

In General Formula (II), examples of the alkenyl group having 4 to 8 carbon atoms and the alkenyloxy group having 3 to 8 carbon atoms as $R^{4\alpha}$ are the same as the examples of the alkenyl group and alkenyloxy group as each of $R^{1\alpha}$ and $R^{2\alpha}$ except for differences in the number of carbon atoms.

The alkyl groups as $R^{3\alpha}$ and $R^{4\alpha}$ each independently preferably have one to six carbon atoms, and more preferably one to five carbon atoms.

The alkoxy groups as $R^{3\alpha}$ and $R^{4\alpha}$ each independently preferably have one to six carbon atoms, and more preferably one to five carbon atoms.

Preferred examples of the compound represented by General Formula (II) include compounds in which $R^{3\alpha}$ is the alkyl group, compounds in which $R^{4\alpha}$ is the alkoxy group, compounds in which $l^2$ is 0 or 1, and compounds in which $G^1$ is a single bond.

Preferred examples of the compound represented by General Formula (II) include compounds represented by General Formulae (II-1) to (II-3).

[Chem. 25]

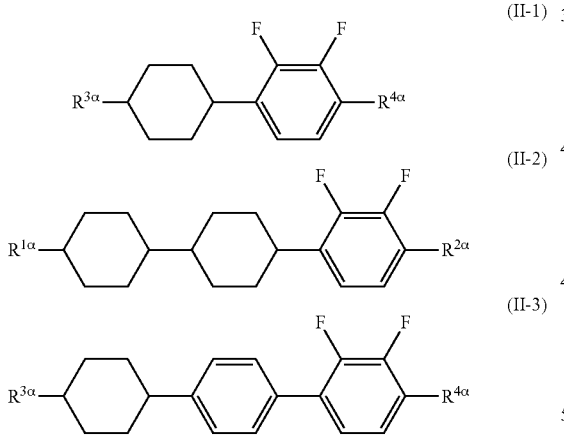

(where $R^{3\alpha}$ and $R^{4\alpha}$ are the same as described above)

The amount of the compound represented by General Formula (II) in the liquid crystal composition is preferably in the range of 30 to 65 mass %, and more preferably 35 to 55 mass %.

In the liquid crystal composition, [the amount of the compound represented by General Formula (II)]/[the amount of the compound represented by General Formula (I)] (mass ratio) is preferably in the range of 8/2 to 2/8, more preferably 7/3 to 3/7, and especially preferably 6/4 to 4/6.

In addition to the compounds represented by General Formulae (I) and (II), the liquid crystal composition may contain a compound represented by General Formula (III), which is different therefrom.

[Chem. 26]

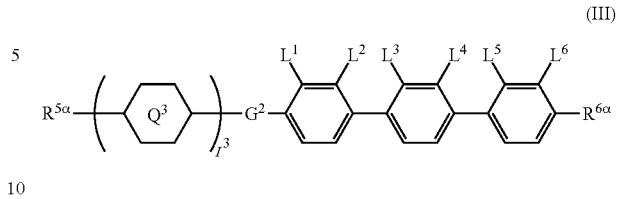

(where $R^{5\alpha}$ and $R^{6\alpha}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms (where one or more methylene groups contained in the alkyl group, alkenyl group, alkoxy group, or alkenyloxy group are each independently optionally substituted with an oxygen atom or —CO— such that oxygen atoms are not directly bonded to each other, and one or more hydrogen atoms contained in the alkylene group are each optionally substituted with fluorine atoms); $Q^3$ is a 1,4-phenylene group or a tetrahydropyran-2,5-diyl group; $l^3$ represents 0 or 1; $G^2$ represents a single bond, —CH$_2$O—, —OCH$_2$—, —CF$_2$O—, or —OCF$_2$—; $L^1$ to $L^6$ each independently represent a hydrogen atom or a fluorine atom; at least two of $L^1$ to $L^6$ each represent a fluorine atom; and in the case where $l^3$ represents 0 and where $G^2$ represents a single bond, each of $L^5$ and $L^6$ does not represent a fluorine atom)

In General Formula (III), the alkyl group having 1 to 8 carbon atoms, the alkenyl group having 2 to 8 carbon atoms, the alkoxy group having 1 to 8 carbon atoms, and the alkenyloxy group having 2 to 8 carbon atoms as each of $R^{5\alpha}$ and $R^{6\alpha}$ have the same meanings as those as each of $R^{1\alpha}$ and $R^{2\alpha}$.

Preferred examples of the compound represented by General Formula (III) include compounds represented by General Formula (III-1).

[Chem. 27]

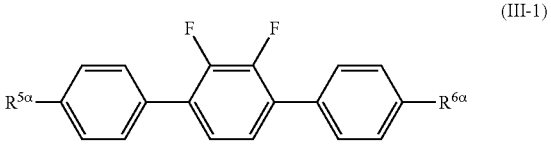

(where $R^{5\alpha}$ and $R^{6\alpha}$ are the same as described above)

In addition to the compounds represented by General Formulae (I) and (II), the liquid crystal composition may contain a compound represented by General Formula (IV), which is different therefrom.

[Chem. 28]

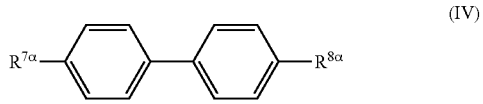

(where $R^{7\alpha}$ and $R^{8\alpha}$ each independently represent an alkyl group having 1 to 10 carbon atoms, an alkenyl group having 2 to 10 carbon atoms, or an alkoxy group having 1 to 10 carbon atoms)

In General Formula (IV), the alkyl group having 1 to 10 carbon atoms as each of $R^{7\alpha}$ and $R^{8\alpha}$ may be linear, branched, or cyclic and is preferably linear or branched; examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, a 3-ethylpentyl group, a 2,2,3-trimethylbutyl group, an n-octyl group, an isooctyl group, a nonyl group, and a decyl group.

The alkyl group as each of $R^{1\alpha}$ and $R^{2\alpha}$ preferably has one to six carbon atoms.

Examples of the alkenyl group having 2 to 10 carbon atoms as each of $R^{7\alpha}$ and $R^{8\alpha}$ in General Formula (IV) include monovalent groups formed by substituting one single bond (C—C) between carbon atoms in the alkyl groups having 2 to 10 carbon atoms as $R^{7\alpha}$ and $R^{8\alpha}$ with a double bond (C=C).

The alkenyl group as each of $R^{7\alpha}$ and $R^{8\alpha}$ preferably has two to six carbon atoms, and examples thereof are the same as in $R^{1\alpha}$ and $R^{2\alpha}$.

In General Formula (IV), examples of the alkoxy group having 1 to 10 carbon atoms as each of $R^{7\alpha}$ and $R^{8\alpha}$ include monovalent groups formed by bonding of the alkyl groups having 1 to 10 carbon atoms as $R^{7\alpha}$ and $R^{8\alpha}$ to an oxygen atom, such as a methoxy group and an ethoxy group.

In addition to the compounds represented by General Formulae (I) and (II), the liquid crystal composition may contain a compound represented by General Formula (V), which is different therefrom.

[Chem. 29]

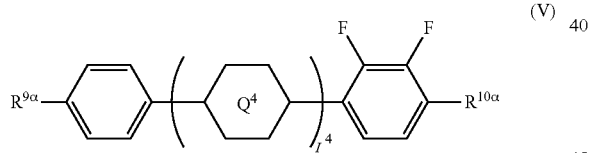

(V)

(where $R^{9\alpha}$ and $R^{10\alpha}$ each independently represent an alkyl group having 1 to 18 carbon atoms, an alkenyl group having 2 to 18 carbon atoms, an alkoxy group having 1 to 18 carbon atoms, or an alkenyloxy group having 2 to 18 carbon atoms; $Q^4$ represents a 1,4-phenylene group or a trans-1,4-cyclohexylene group; and $l^4$ represents 0 or 1)

In General Formula (V), the alkyl group having 1 to 18 carbon atoms as each of $R^{9\alpha}$ and $R^{10\alpha}$ may be linear, branched, or cyclic and is preferably linear or branched; examples thereof include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, a 1-methylbutyl group, an n-hexyl group, a 2-methylpentyl group, a 3-methylpentyl group, a 2,2-dimethylbutyl group, a 2,3-dimethylbutyl group, an n-heptyl group, a 2-methylhexyl group, a 3-methylhexyl group, a 2,2-dimethylpentyl group, a 2,3-dimethylpentyl group, a 2,4-dimethylpentyl group, a 3,3-dimethylpentyl group, a 3-ethylpentyl group, a 2,2,3-trimethylbutyl group, an n-octyl group, an isooctyl group, a nonyl group, a decyl group, an undecyl group, a dodecyl group, a tridecyl group, a tetradecyl group, a pentadecyl group, a hexadecyl group, a heptadecyl group, and an octadecyl group.

The alkyl group as each of $R^{9\alpha}$ and $R^{10\alpha}$ preferably has 1 to 10 carbon atoms, and more preferably 1 to 6 carbon atoms.

Examples of the alkenyl group having 2 to 18 carbon atoms as each of $R^{9\alpha}$ and $R^{10\alpha}$ in General Formula (V) include monovalent groups formed by substituting one single bond (C—C) between carbon atoms in the alkyl groups having 2 to 18 carbon atoms as $R^{9\alpha}$ and $R^{10\alpha}$ with a double bond (C=C).

The alkenyl group as each of $R^{9\alpha}$ and $R^{10\alpha}$ preferably has two to six carbon atoms, and examples thereof are the same as in $R^{1\alpha}$ and $R^{2\alpha}$.

In General Formula (V), examples of the alkoxy group having 1 to 18 carbon atoms as each of $R^{9\alpha}$ and $R^{10\alpha}$ include monovalent groups formed by bonding of the alkyl groups having 1 to 18 carbon atoms as $R^{9\alpha}$ and $R^{10\alpha}$ to an oxygen atom, such as a methoxy group and an ethoxy group.

The alkoxy group as $R^{9\alpha}$ and $R^{10\alpha}$ preferably has 1 to 10 carbon atoms, and more preferably 1 to 6 carbon atoms.

In General Formula (V), examples of the alkenyloxy group having 2 to 18 carbon atoms as each of $R^{9\alpha}$ and $R^{10\alpha}$ include monovalent groups formed by bonding of the alkenyl groups having 2 to 18 carbon atoms as $R^{9\alpha}$ and $R^{10\alpha}$ to an oxygen atom, such as an ethenyloxy group and 2-propenyloxy group.

Preferred examples of the compound represented by General Formula (V) include compounds represented by General Formula (V-1).

[Chem. 30]

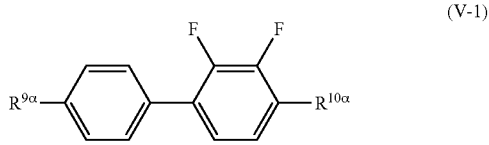

(V-1)

(where $R^{9\alpha}$ and $R^{10\alpha}$ are the same as described above)

The amount of components such as the compounds represented by General Formulae (III), (IV), and (V), which are different from the compounds represented by General Formulae (I) and (II), in the liquid crystal composition is preferably not more than 25 mass %, and more preferably not more than 20 mass %.

The liquid crystal display device 10 may further include a passivation film (not illustrated) formed at at least one of the positions between the first substrate 11 and the liquid crystal layer 13 and between the second substrate 12 and the liquid crystal layer 13. The passivation film provided in this manner can protect the surface of the adjacent first substrate 11 or second substrate 12.

The liquid crystal display device 10 may further include a planarization film (not illustrated) formed at at least one of positions between the first substrate 11 and the liquid crystal layer 13 and between the second substrate 12 and the liquid crystal layer 13. The planarization film provided in this manner further enhances properties inherent in liquid crystal display devices. In the case where the surface of the passivation film has a high flatness, such a passivation film may also serve as the planarization film.

Each of the passivation film and the planarization film may be known one where appropriate.

In the liquid crystal display device of the present invention, a liquid crystal composition in which the specific compounds represented by General Formulae (I) and (II) are used as liquid crystal molecules is used in combination with the orientation controlling layers formed of two or more polymerizable compounds; thus, in a state in which voltage is not applied, liquid crystal molecules are aligned to be substantially vertical to the substrate planes without alignment films being provided between the first substrate and the liquid crystal layer and between the second substrate and the liquid crystal layer, which makes the liquid crystal display device distinct from existing liquid crystal display devices. Image sticking and droplet stains that occur in a production process can be reduced without degradation of properties such as dielectric anisotropy, viscosity, the upper limit of the temperature of a nematic phase, and rotational viscosity ($\gamma_1$).

<Method for Manufacturing Liquid Crystal Display Device>

The liquid crystal display device 10 illustrated in FIG. 1 can be manufactured, for example, as follows.

The first substrate 11 and the second substrate 12 are placed so as to face each other, and a liquid-crystal-containing polymerization composition that is used for forming the liquid crystal layer 13 and the orientation controlling layers in the below step is disposed therebetween. The liquid-crystal-containing polymerization composition contains the compound represented by General Formula (I), the compound represented by General Formula (II), and two or more of the polymerizable compounds as essential components.

Specifically, spacer protrusions for securing a cell gap, such as plastic beads, are distributed on any one of the facing planes of the first and second substrates 11 and 12, and a sealing portion is printed (formed) thereon by screen printing with, for instance, an epoxy adhesive. The second-substrate-12-facing plane of the first substrate 11 is the plane on which the common electrode 14 and the color filter 18 are provided, and the first-substrate-11-facing plane of the second substrate 12 is the plane on which the pixel electrodes 15 are provided.

Next, after the first substrate 11 and the second substrate 12 are placed so as to face each other and attached to each other with the spacer protrusions and sealing portion interposed therebetween, the liquid-crystal-containing polymerization composition is injected into the defined space. The sealing portion is cured by heating or another technique to hold the liquid-crystal-containing polymerization composition between the first substrate 11 and the second substrate 12.

Figure 3:
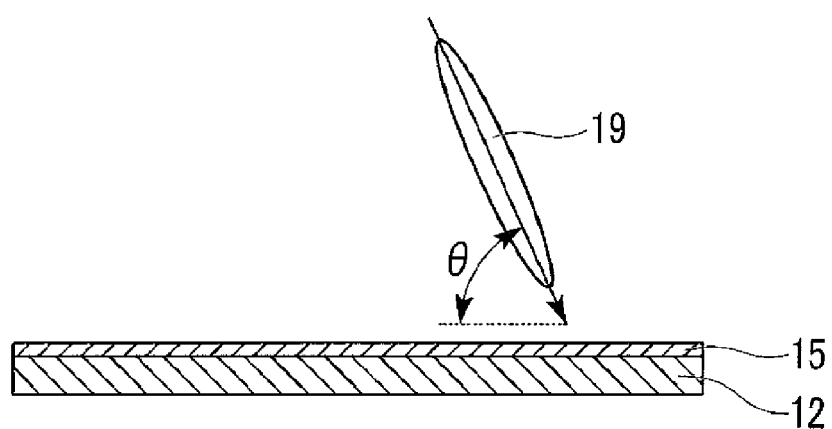
FIG. 3 illustrates definition of a pretilt angle in the liquid crystal display device of the present invention.

Then, voltage is applied between the common electrode 14 and the pixel electrodes 15 with a voltage applying unit. The voltage is, for instance, in the range of 5 to 30 V. The application of voltage generates an electric field in a direction that defines a predetermined angle with respect to the adjacent plane of the first substrate 11 to the liquid-crystal-containing polymerization composition (plane facing the liquid-crystal-containing polymerization composition) and the adjacent plane of the second substrate 12 to the liquid-crystal-containing polymerization composition (plane facing the liquid-crystal-containing polymerization composition), and thus the liquid crystal molecules 19 in the liquid-crystal-containing polymerization composition (the compound represented by General Formula (I) and the compound represented by General Formula (II)) are aligned in a direction tilted at the intended angle with respect to the direction normal to the first substrate 11 and the second substrate 12, which gives the liquid crystal molecules 19 a pretilt angle θ as illustrated in FIG. 3. The pretilt angle θ can be controlled by appropriately adjusting the voltage.

Then, in a state in which the voltage has been applied, an active energy ray such as ultraviolet is emitted, for example, from the outside of the first substrate 11 to the liquid-crystal-containing polymerization composition to polymerize the two or more polymerizable compounds. The active energy ray may be radiated from the outside of the second substrate 12 or from both the outside of the first substrate 11 and the outside of the second substrate 12.

The irradiation with the active energy ray enables the reaction of the two or more polymerizable compounds in the liquid-crystal-containing polymerization composition, so that the liquid-crystal-containing polymerization composition is converted into a liquid crystal composition having a specific composition to serve as the liquid crystal layer 13 and that also the orientation controlling layers are formed between the first substrate 11 and the liquid crystal layer 13 and between the second substrate 12 and the liquid crystal layer 13.

The formed orientation controlling layers give the pretilt angle θ to the liquid crystal molecules 19 positioned adjacent to the first substrate 11 and the second substrate 12 in the liquid crystal layer 13 in a non-driven state.

The intensity of the active energy ray to be emitted may be constant or variable. In the case where the intensity is changed, time for the irradiation at each of the changed intensities can be appropriately determined; if the irradiation procedure includes two or more steps, the intensity is preferably smaller in the second and subsequent steps than in the first step, and the total time for the irradiation and the total energy of the radiated ray are greater in the second and subsequent steps than in the first step. If the intensity is discontinuously changed, it is preferred that the average intensity of the radiated ray be stronger in the first half of the total time of the radiation procedure than the latter half, it is more preferred that the intensity be strongest immediately after the start of the radiation, and it is further preferred that the intensity constantly continue to be decreased to a certain level as the lapse of time for the radiation. In this case, it is preferred that the intensity of the active energy ray to be radiated be from 2 to 100 $mW/cm^2$, and it is more preferred that the maximum intensity in the first step of the multistep radiation or in the total radiation steps in the case of the discontinuous change in the intensity be from 10 to 100 $mW/cm^2$ and that the minimum intensity in the second and subsequent steps of the multistep radiation or in the case of the discontinuous change in the intensity be from 250 $mW/cm^2$. The total amount of the radiated energy is preferably in the range of 10 to 300 J, more preferably 50 to 250 J, and further preferably 100 to 250 J.

The voltage to be applied may be alternate voltage or direct voltage.

The active energy ray to be radiated preferably has multiple spectra, and ultraviolet having multiple spectra is preferably employed. The irradiation with an active energy ray having multiple spectra enables two or more of the polymerizable compounds to be polymerizable with active energy rays having proper spectra (wavelengths) for their types, which contributes to more efficient formation of the orientation controlling layers.

The orientation controlling layers are composed of the polymers of the polymerization compounds; for example, the orientation controlling layer formed between the first substrate 11 and the liquid crystal layer 13 does not necessarily make the distinct boundary therebetween, and it is presumed that the orientation controlling layer is formed so as to enter the inside of the liquid crystal layer 13 from the adjacent plane of the first substrate 11 to the liquid crystal layer 13 (plane facing the liquid crystal layer 13) in the vicinity of the first substrate 11 in some cases. Likewise, in the vicinity of the second substrate 12, the orientation controlling layer formed between the second substrate 12 and the liquid crystal layer 13 does not necessarily make the distinct boundary therebetween, and it is presumed that the orientation controlling layer is formed so as to enter the inside of the liquid crystal layer 13 from the adjacent plane of the second substrate 12 to the liquid crystal layer 13 (plane facing the liquid crystal layer 13) in the vicinity of the second substrate 12 in some cases.

It is, however, difficult to describe the accurate configurations of the orientation controlling layers.

In addition, the following is presumed: among the two or more polymerizable compounds, compounds having similar structures to each other are polymerized first by being irradiated with an active energy ray, so that the liquid crystal molecules are aligned in regions adjacent to the substrates and that the direction of the pretilt is defined to be in the intended direction, thereby controlling the alignment.

EXAMPLES

The present invention will now be further specifically described with reference to Examples and Comparative Examples but is not limited thereto. In Examples and Comparative Examples, the term "wt %" refers to mass %.

In Examples and Comparative Examples, $T_{NI}$, $\Delta n$, $\Delta \in$, $\eta$, and $\gamma_1$ are defined as follows.

$T_{NI}$: Nematic phase-isotropic liquid phase transition temperature (° C.)
$\Delta n$: Refractive index anisotropy at 25° C.
$\Delta \in$: Dielectric anisotropy at 25° C.
$\eta$: Viscosity at 20° C. (mPa·s)
$\gamma_1$: Rotational viscosity at 25° C. (mPa·s)

Liquid crystal display devices produced in Examples and Comparative Examples which will be described later were subjected to evaluations of image sticking and droplet stains as follows.

(Evaluation of Image Sticking)

In evaluation of image sticking in a liquid crystal display device, a certain fixed pattern was displayed in a display area for 1000 hours, and then an image was shown evenly on the whole of the screen. Then, the degree of an afterimage of the fixed pattern was visually observed, and result of the observation was evaluated on the basis of the following four criteria.

Excellent: No afterimage observed
Good: Slight afterimage observed, but acceptable
Bad: Afterimage observed, unacceptable
Poor: Afterimage observed, quite inadequate (Evaluation of Droplet Stains)

In order to evaluate droplet stains in a liquid crystal display apparatus, white droplet stains which emerged in an entirely-black display mode were visually observed. Result of the observation was evaluated on the basis of the following four criteria.

Excellent: No afterimage observed
Good: Slight afterimage observed, but acceptable
Bad: Afterimage observed, unacceptable
Poor: Afterimage observed, quite inadequate Example 1

A first substrate provided with a transparent electrode layer as a transparent common electrode and a color filter layer (common electrode substrate) and a second substrate provided with transparent pixel electrodes driven by active devices (pixel electrode substrate) were prepared. The pixel electrodes used had slits, and thus each pixel was segmented into four regions each having a different direction of pretilt.

A liquid-crystal-containing starting composition LC-1 that contained the following compounds corresponding to the compounds represented by General Formulae (I), (II), and (III) in the specified content percentages was prepared.

[Chem. 31]

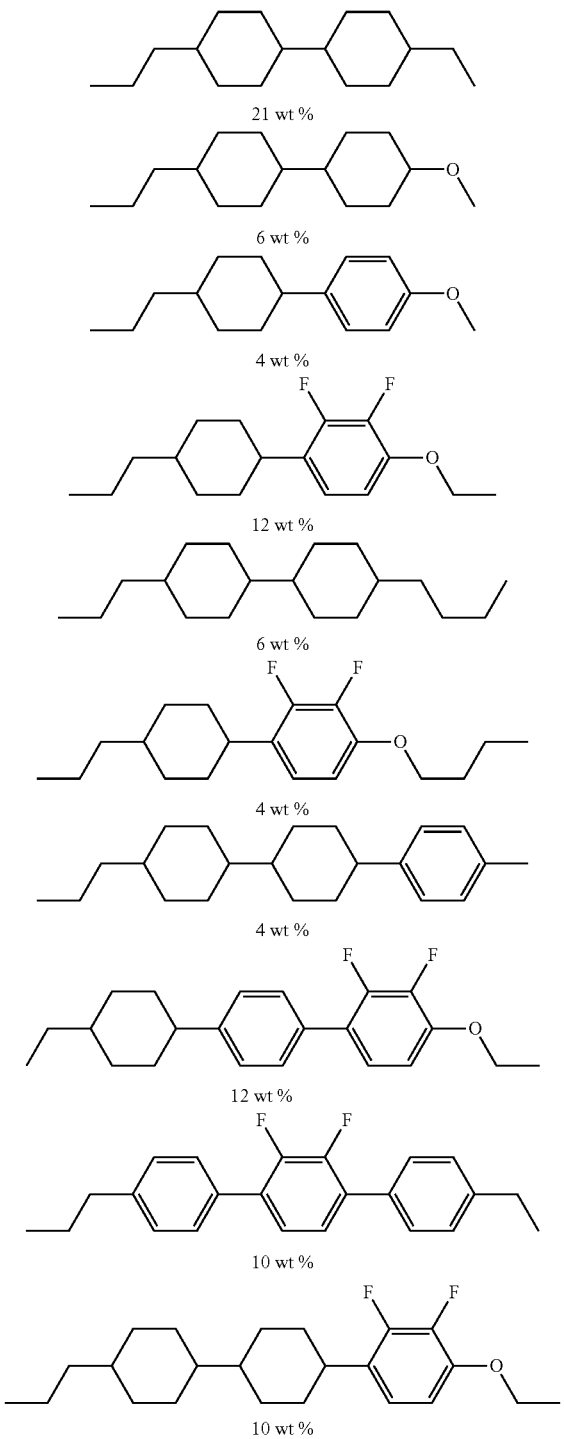

-continued

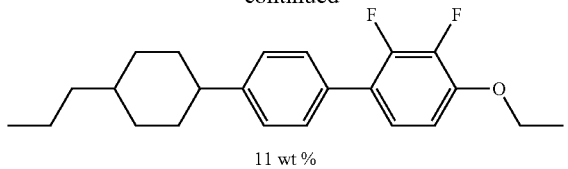

11 wt %

Then, a compound represented by the below formula as the first polymerizable compound represented by General Formula (X1a) ((X1a-1-1)) (1.5 mass %) and a compound represented by the below formula as the second polymerizable compound represented by General Formula (X2a) (0.4 mass %) were added to the liquid-crystal-containing starting composition LC-1 (98.0 mass %).

[Chem. 32]

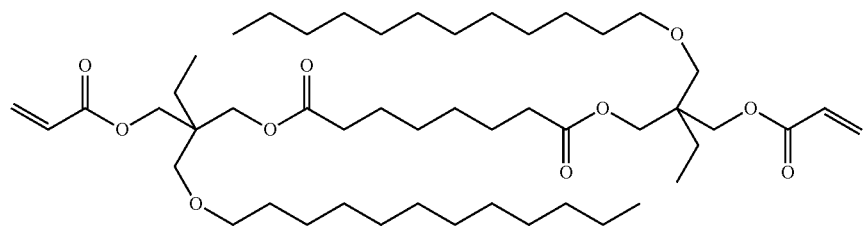

[Chem. 33]

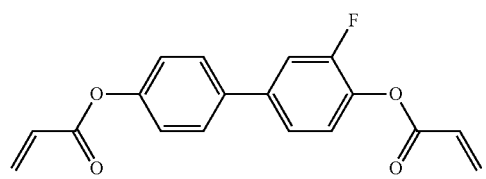

Furthermore, a photopolymerization initiator "Igacure 651" (0.1 mass %) was added thereto, and the added materials were uniformly dissolved to prepare a liquid-crystal-containing polymerization composition CLC-1.

Then, the first substrate and the second substrate were attached to each other with a sealing portion interposed therebetween; subsequently, the liquid-crystal-containing polymerization composition CLC-1 was injected thereinto without use of an alignment film, and the sealing portion was cured to hold the liquid-crystal-containing polymerization composition CLC-1. In this process, a spacer having a thickness of 3.2 μm was used to define the thickness of the layer of the liquid-crystal-containing polymerization composition to be 3.2 μm.

Then, in a state in which voltage had been applied, the liquid-crystal-containing polymerization composition was irradiated with ultraviolet in order to polymerize the first polymerizable compound and the second polymerizable compound. In this process, the ultraviolet irradiation apparatus used was "USH-250BY" manufactured by USHIO INC., and ultraviolet was radiated at 100 mW for 10 minutes.

Through this process, a liquid crystal display device was produced.

In this liquid crystal display device, a pretilt angle θ given to the liquid crystal molecules was maintained even in a state in which voltage was not applied and was 87°.

Table 1 shows results of the evaluations in the liquid crystal display device. As shown in Table 1, the liquid crystal display device had an excellent contrast and response speed, excellent properties inherent in liquid crystal display devices, and good effect on a reduction in the occurrence of image sticking and droplet stains.

TABLE 1

| $T_{NI}/°$ C. | 75.4 |
|---|---|
| $\Delta_n$ | 0.107 |
| $n_o$ | 1.485 |
| $\epsilon_{//}$ | 3.55 |
| $\epsilon_\perp$ | 6.45 |
| $\Delta\epsilon$ | -2.9 |
| $\eta$/mPa · s | 20.2 |
| $\gamma_1$/mPa · s | 142 |
| Contrast | 1300 |
| Response speed/ms | 14 |

TABLE 1-continued

| Evaluation of droplet stains | Excellent |
|---|---|
| Evaluation of image sticking | Excellent |

Example 2

A compound represented by the below formula as the first polymerizable compound represented by General Formula (X1b) (1.0 mass %) and a compound represented by the below formula as the second polymerizable compound represented by General Formula (X2a) (0.4 mass %) were added to the liquid-crystal-containing starting composition LC-1 prepared in Example 1 (98.5 mass %).

[Chem. 34]

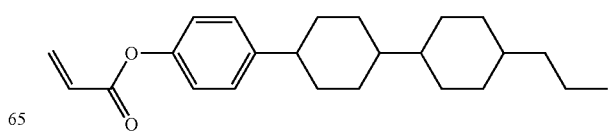

[Chem. 35]

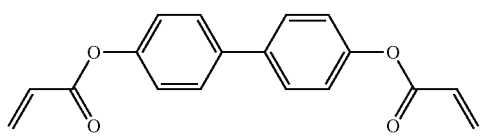

Furthermore, a photopolymerization initiator "Igacure 651" (0.1 mass %) was added thereto, the added materials were uniformly dissolved to prepare a liquid-crystal-containing polymerization composition CLC-1a, and this liquid-crystal-containing polymerization composition CLC-1a was used. Except for this change, a liquid crystal display device was produced as in Example 1.

In this liquid crystal display device, a pretilt angle θ given to the liquid crystal molecules was maintained even in a state in which voltage was not applied and was 87.8°.

Table 2 shows results of the evaluations in the liquid crystal display device. As shown in Table 2, the liquid crystal display device had an excellent contrast and response speed, excellent properties inherent in liquid crystal display devices, and good effect on a reduction in the occurrence of image sticking and droplet stains.

TABLE 2

| | |
|---|---|
| $T_{NI}/°C$ | 75.4 |
| $\Delta_n$ | 0.107 |
| $n_o$ | 1.485 |
| $\epsilon_{//}$ | 3.55 |
| $\epsilon_\perp$ | 6.45 |
| $\Delta\epsilon$ | −2.9 |
| $\eta/mPa \cdot s$ | 20.2 |
| $\gamma_1/mPa \cdot s$ | 142 |
| Contrast | 1450 |
| Response speed/ms | 14.2 |
| Evaluation of droplet stains | Excellent |
| Evaluation of image sticking | Excellent |

Comparative Example 1

A first substrate provided with a transparent electrode layer as a transparent common electrode, a color filter layer, and protrusions formed on a surface thereof to control the direction of alignment of liquid crystal molecules (common electrode substrate) and a second substrate provided with transparent pixel electrodes driven by active devices and protrusions formed on a surface thereof to control the direction of alignment of liquid crystal molecules (pixel electrode substrate) were prepared.

Then, a material for forming a vertical alignment film was applied to each of the first substrate and the second substrate by spin coating, and the coating was heated at 200° C. to form a vertical alignment film having a thickness of 100 nm on the surface of each substrate.

Except that these substrates having the vertical alignment films were used to hold the liquid-crystal-containing starting composition LC-1 therebetween instead of the liquid-crystal-containing polymerization composition CLC-1 (the first polymerizable compound, the second polymerizable compound, and the photopolymerization initiator were not used), a liquid crystal display device was produced as in Example 1.

Table 3 shows results of the evaluations in the liquid crystal display device. As shown in Table 3, the liquid crystal display device was more unsatisfactory in response speed and effect on a reduction in the occurrence of image sticking and droplet stains than the liquid crystal display devices of Examples 1 and 2.

TABLE 3

| | |
|---|---|
| $T_{NI}/°C$ | 75.4 |
| $\Delta_n$ | 0.107 |
| $n_o$ | 1.485 |
| $\epsilon_{//}$ | 3.55 |
| $\epsilon_\perp$ | 6.45 |
| $\Delta\epsilon$ | −2.9 |
| $\eta/mPa \cdot s$ | 20.2 |
| $\gamma_1/mPa \cdot s$ | 142 |
| Contrast | 1300 |
| Response speed/ms | 20 |
| Evaluation of droplet stains | Bad |
| Evaluation of image sticking | Good |

Example 3

A liquid-crystal-containing starting composition LC-2 that contained the following compounds corresponding to the compounds represented by General Formulae (I), (II), and (III) in the specified content percentages was prepared.

[Chem. 36]

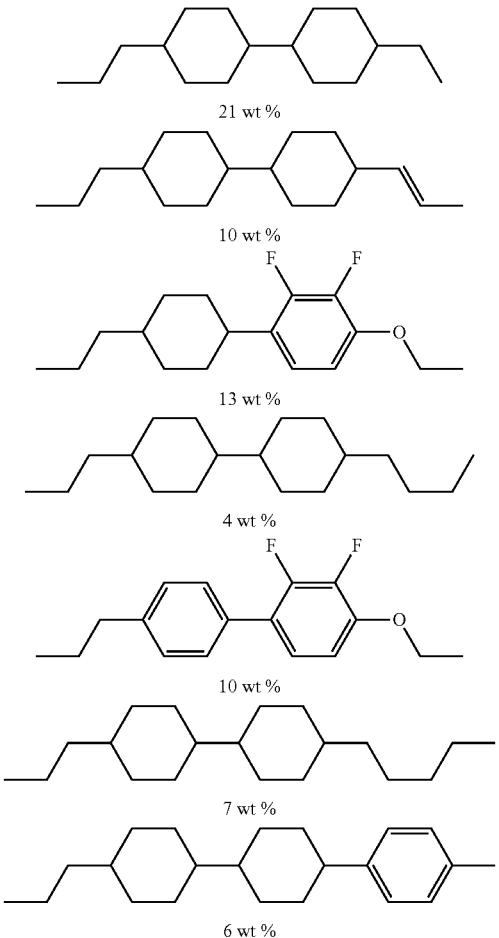

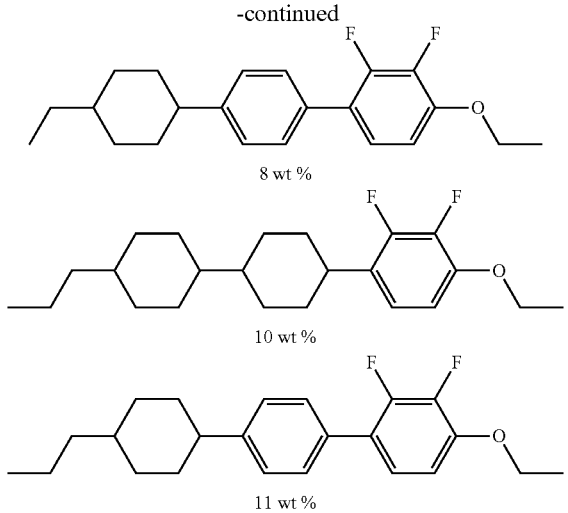

Then, a compound represented by the below formula as the first polymerizable compound represented by General Formula (X1a) (1.5 mass %) and a compound represented by the below formula as the second polymerizable compound represented by General Formula (X2a) (0.4 mass %) were added to the liquid-crystal-containing starting composition LC-2 (98.0 mass %).

[Chem. 37]

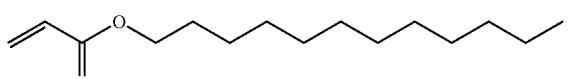

[Chem. 38]

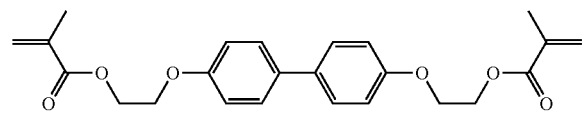

Furthermore, a photopolymerization initiator "Igacure 651" (0.1 mass %) was added thereto, and the added materials were uniformly dissolved to prepare a liquid-crystal-containing polymerization composition CLC-2.

The liquid-crystal-containing polymerization composition CLC-2 was used in place of the liquid-crystal-containing polymerization composition CLC-1, and a spacer having a thickness of 3.5 μm was used instead of the spacer having a thickness of 3.2 μm to define the thickness of the layer of the liquid-crystal-containing polymerization composition to be 3.5 μm. Except for these changes, a liquid crystal display device was produced as in Example 1.

In this liquid crystal display device, a pretilt angle θ given to the liquid crystal molecules was maintained even in a state in which voltage was not applied and was 87.5°.

Table 4 shows results of the evaluations in the liquid crystal display device. As shown in Table 4, the liquid crystal display device had an excellent contrast and response speed, excellent properties inherent in liquid crystal display devices, and good effect on a reduction in the occurrence of image sticking and droplet stains.

TABLE 4

| | |
|---|---|
| $T_{NI}/°C.$ | 74.1 |
| $\Delta_n$ | 0.097 |
| $n_o$ | 1.481 |
| $\epsilon_{//}$ | 3.36 |
| $\epsilon_\perp$ | 6.63 |
| $\Delta\epsilon$ | -3.27 |
| $\eta/mPa \cdot s$ | 15.6 |
| $\gamma_1/mPa \cdot s$ | 100 |
| Contrast | 1800 |
| Response speed/ms | 21 |
| Evaluation of droplet stains | Excellent |
| Evaluation of image sticking | Excellent |

Example 4

A compound represented by the below formula as the first polymerizable compound represented by General Formula (X1c) (1.2 mass %) and a compound represented by the below formula as the second polymerizable compound represented by General Formula (X2a) (0.4 mass %) were added to the liquid-crystal-containing starting composition LC-2 prepared in Example 3 (98.3 mass %).

[Chem. 39]

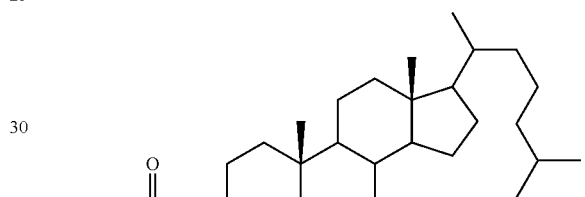

[Chem. 40]

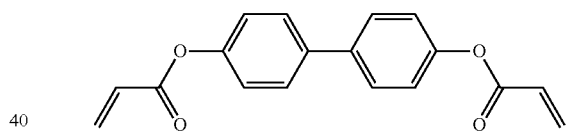

Furthermore, a photopolymerization initiator "Igacure 651" (0.1 mass %) was added thereto, the added materials were uniformly dissolved to prepare a liquid-crystal-containing polymerization composition CLC-2a, and this liquid-crystal-containing polymerization composition CLC-2a was used. Except for this change, a liquid crystal display device was produced as in Example 3.

In this liquid crystal display device, a pretilt angle θ given to the liquid crystal molecules was maintained even in a state in which voltage was not applied and was 87.9°.

Table 5 shows results of the evaluations in the liquid crystal display device. As shown in Table 5, the liquid crystal display device had an excellent contrast and response speed, excellent properties inherent in liquid crystal display devices, and good effect on a reduction in the occurrence of image sticking and droplet stains.

TABLE 5

| | |
|---|---|
| $T_{NI}/°C.$ | 74.1 |
| $\Delta_n$ | 0.097 |
| $n_o$ | 1.481 |
| $\epsilon_{//}$ | 3.36 |
| $\epsilon_\perp$ | 6.63 |
| $\Delta\epsilon$ | -3.27 |
| $\eta/mPa \cdot s$ | 15.6 |

TABLE 5-continued

| | |
|---|---|
| $\gamma_1$/mPa·s | 100 |
| Contrast | 1830 |
| Response speed/ms | 20.9 |
| Evaluation of droplet stains | Excellent |
| Evaluation of image sticking | Excellent |

Comparative Example 2

A first substrate and second substrate each provided with a vertical alignment film were prepared as in Comparative Example 1.

These substrates having the vertical alignment films were used to hold the liquid-crystal-containing starting composition LC-2 prepared in Example 3 therebetween instead of the liquid-crystal-containing polymerization composition CLC-1 (the first polymerizable compound, the second polymerizable compound, and the photopolymerization initiator were not used), and a spacer having a thickness of 3.8 μm was used instead of the spacer having a thickness of 3.2 μm to define the thickness of the layer of the liquid-crystal-containing starting composition to be 3.8 μm. Except for these changes, a liquid crystal display device was produced as in Example 1.

Table 6 shows results of the evaluations in the liquid crystal display device. As shown in Table 6, the liquid crystal display device was more unsatisfactory in response speed and effect on a reduction in the occurrence of image sticking and droplet stains than the liquid crystal display devices of Examples 3 and 4.

TABLE 6

| | |
|---|---|
| $T_{NI}$/° C. | 75.4 |
| $\Delta_n$ | 0.107 |
| $n_o$ | 1.485 |
| $\epsilon_{//}$ | 3.55 |
| $\epsilon_\perp$ | 6.45 |
| $\Delta\epsilon$ | -2.9 |
| $\eta$/mPa·s | 20.2 |
| $\gamma_1$/mPa·s | 142 |
| Contrast | 1400 |
| Response speed/ms | 28 |
| Evaluation of droplet stains | Bad |
| Evaluation of image sticking | Good |

Example 5

A liquid-crystal-containing starting composition LC-3 that contained the following compounds corresponding to the compounds represented by General Formulae (I), (II), (IV), and (V) in the specified content percentages was prepared.

[Chem. 41]

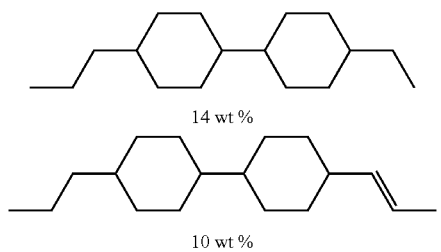

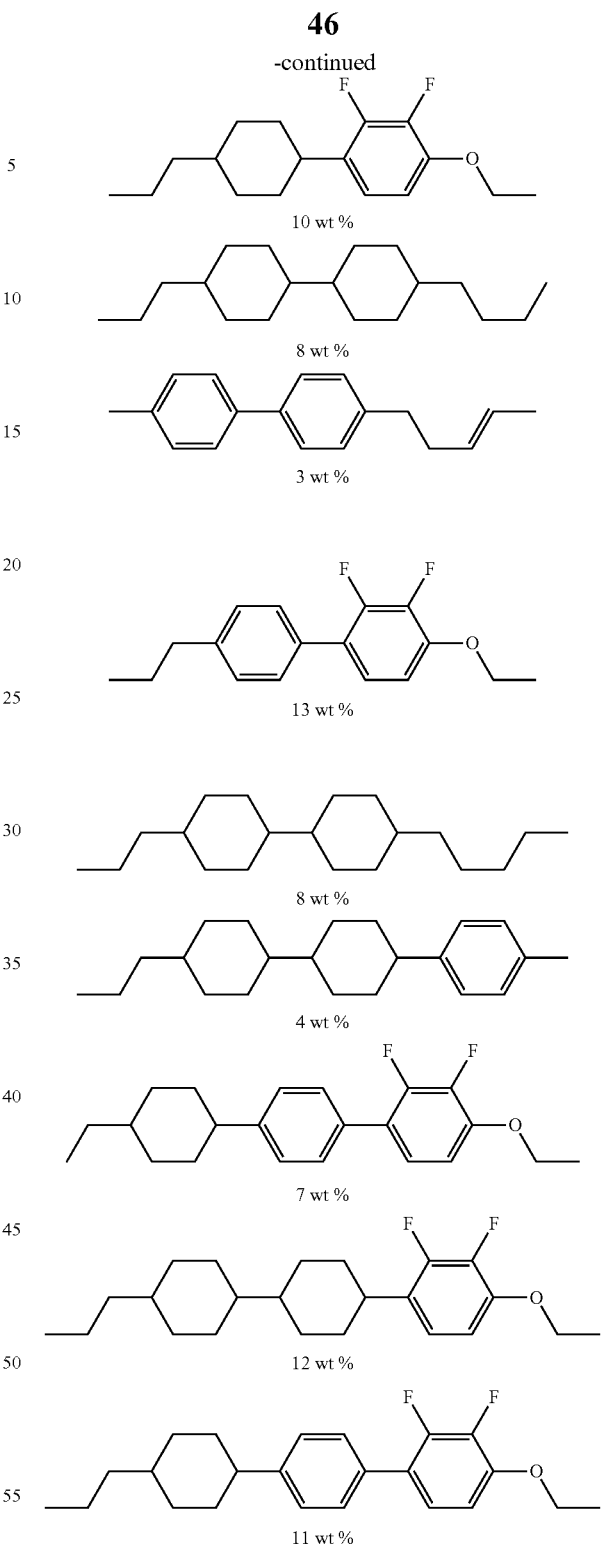

Then, a compound represented by the below formula as the first polymerizable compound represented by General Formula (X1a) ((X1a-1-1)) (1.5 mass %) and a compound represented by the below formula as the second polymerizable compound represented by General Formula (X2a) (0.4 mass %) were added to the liquid-crystal-containing starting composition LC-3 (98.0 mass %).

[Chem. 42]

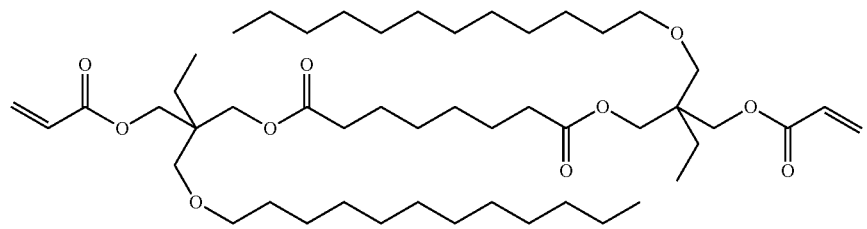

[Chem. 43]

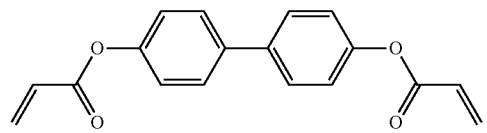

Furthermore, a photopolymerization initiator "Igacure 651" (0.1 mass %) was added thereto, and the added materials were uniformly dissolved to prepare a liquid-crystal-containing polymerization composition CLC-3.

The liquid-crystal-containing polymerization composition CLC-3 was used in place of the liquid-crystal-containing polymerization composition CLC-1, and a spacer having a thickness of 3.5 μm was used instead of the spacer having a thickness of 3.2 μm to define the thickness of the layer of the liquid-crystal-containing polymerization composition to be 3.5 μm. Except for these changes, a liquid crystal display device was produced as in Example 1.

In this liquid crystal display device, a pretilt angle θ given to the liquid crystal molecules was maintained even in a state in which voltage was not applied and was 87.7°.

Table 7 shows results of the evaluations in the liquid crystal display device. As shown in Table 7, the liquid crystal display device had an excellent contrast and response speed, excellent properties inherent in liquid crystal display devices, and good effect on a reduction in the occurrence of image sticking and droplet stains.

TABLE 7

| | |
|---|---|
| $T_{NI}/°$ C. | 73.4 |
| $\Delta_n$ | 0.098 |
| $n_o$ | 1.437 |
| $\epsilon_{//}$ | 3.26 |
| $\epsilon_{\perp}$ | 6.63 |
| $\Delta\epsilon$ | -3.37 |
| η/mPa · s | 15.5 |
| $\gamma_1$/mPa · s | 94 |
| Contrast | 1600 |
| Response speed/ms | 18 |
| Evaluation of droplet stains | Excellent |
| Evaluation of image sticking | Excellent |

Example 6

A compound represented by the below formula as the first polymerizable compound represented by General Formula (X1a) (1.5 mass %) and a compound represented by the below formula as the second polymerizable compound represented by General Formula (X2a) (0.3 mass %) were added to the liquid-crystal-containing starting composition LC-3 prepared in Example 5 (98.1 mass %).

[Chem. 44]

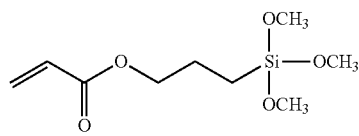

[Chem. 45]

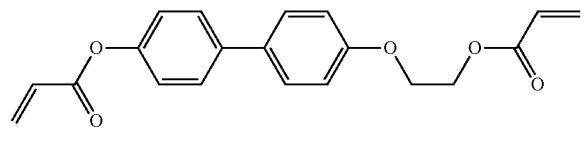

Furthermore, a photopolymerization initiator "Igacure 651" (0.1 mass %) was added thereto, the added materials were uniformly dissolved to prepare a liquid-crystal-containing polymerization composition CLC-3a, and this liquid-crystal-containing polymerization composition CLC-3a was used. Except for this change, a liquid crystal display device was produced as in Example 5.

In this liquid crystal display device, a pretilt angle θ given to the liquid crystal molecules was maintained even in a state in which voltage was not applied and was 87.4°.

Table 8 shows results of the evaluations in the liquid crystal display device. As shown in Table 8, the liquid crystal display device had an excellent contrast and response speed, excellent properties inherent in liquid crystal display devices, and good effect on a reduction in the occurrence of image sticking and droplet stains.

TABLE 8

| | |
|---|---|
| $T_{NI}/°$ C. | 73.4 |
| $\Delta_n$ | 0.098 |
| $n_o$ | 1.437 |
| $\epsilon_{//}$ | 3.26 |
| $\epsilon_{\perp}$ | 6.63 |
| $\Delta\epsilon$ | -3.37 |
| η/mPa · s | 15.5 |
| $\gamma_1$/mPa · s | 94 |
| Contrast | 1640 |
| Response speed/ms | 18.2 |
| Evaluation of droplet stains | Excellent |
| Evaluation of image sticking | Excellent |

Comparative Example 3

A first substrate and second substrate each provided with a vertical alignment film were prepared as in Comparative Example 1.

These substrates having the vertical alignment films were used to hold the liquid-crystal-containing starting composition LC-3 prepared in Example 5 therebetween instead of the liquid-crystal-containing polymerization composition CLC-1 (the first polymerizable compound, the second polymerizable compound, and the photopolymerization initiator were not used), and a spacer having a thickness of 3.5 µm was used instead of the spacer having a thickness of 3.2 µm to define the thickness of the layer of the liquid-crystal-containing starting composition to be 3.5 µm. Except for these changes, a liquid crystal display device was produced as in Example 1.

Table 9 shows results of the evaluations in the liquid crystal display device. As shown in Table 9, the liquid crystal display device was more unsatisfactory in response speed and effect on a reduction in the occurrence of image sticking and droplet stains than the liquid crystal display devices of Examples 5 and 6.

TABLE 9

| | |
|---|---|
| $T_{NI}/°C$ | 73.4 |
| $\Delta_n$ | 0.098 |
| $n_o$ | 1.437 |
| $\epsilon_{//}$ | 3.26 |
| $\epsilon_\perp$ | 6.63 |
| $\Delta\epsilon$ | -3.37 |
| $\eta/mPa \cdot s$ | 15.5 |
| $\gamma_1/mPa \cdot s$ | 94 |
| Contrast | 1350 |
| Response speed/ms | 24 |
| Evaluation of droplet stains | Bad |
| Evaluation of image sticking | Good |

Example 7

A liquid-crystal-containing starting composition LC-4 that contained the following compounds corresponding to the compounds represented by General Formulae (I), (II), and (III) in the specified content percentages was prepared.

[Chem. 46]

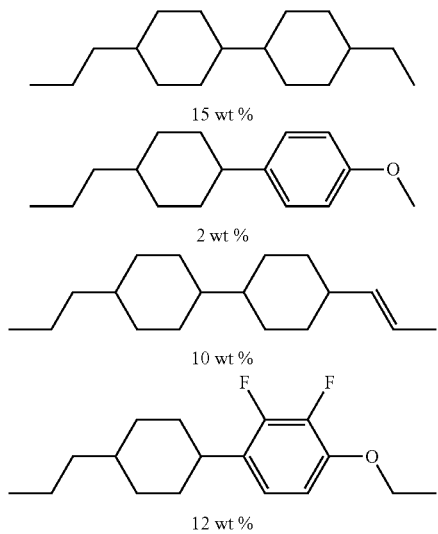

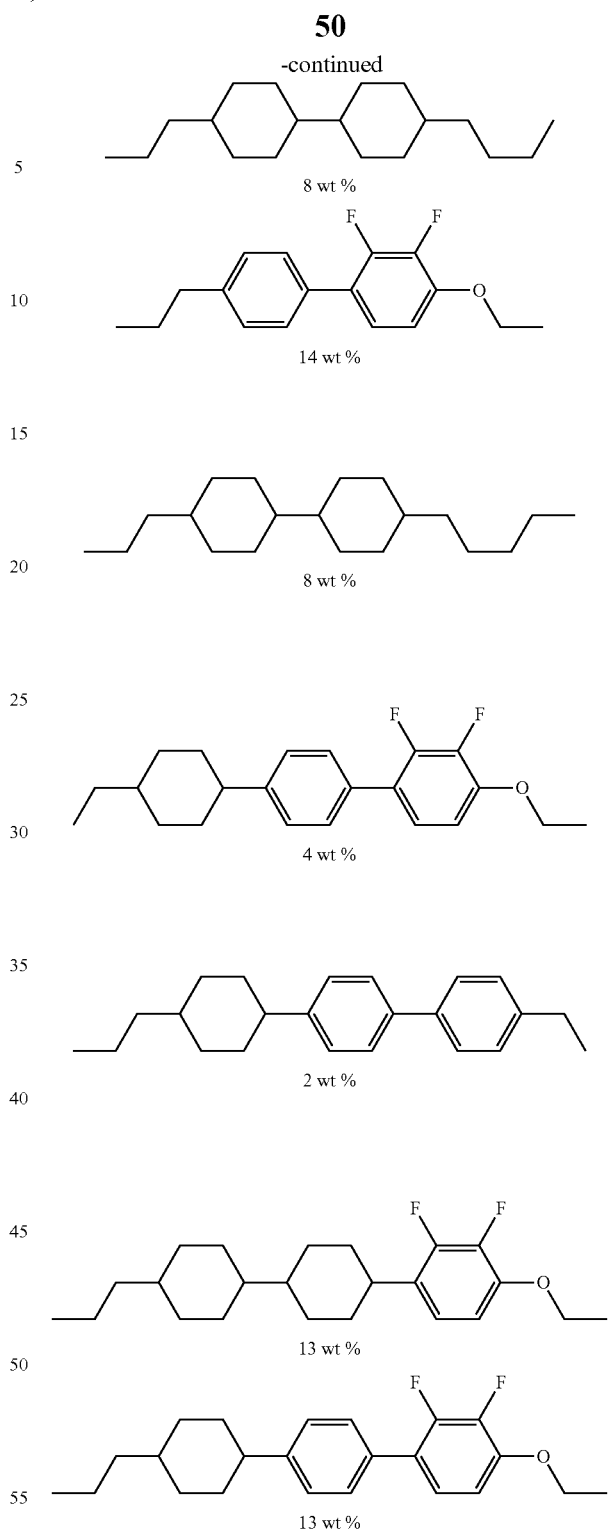

Then, a compound represented by the below formula as the first polymerizable compound represented by General Formula (X1a) (1.5 mass %) and a compound represented by the below formula as the second polymerizable compound represented by General Formula (X2a) (0.4 mass %) were added to the liquid-crystal-containing starting composition LC-4 (98.0 mass %).

[Chem. 47]

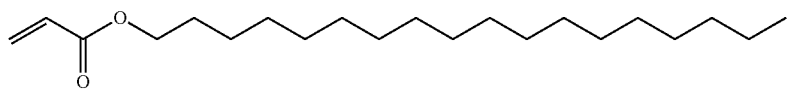

[Chem. 48]

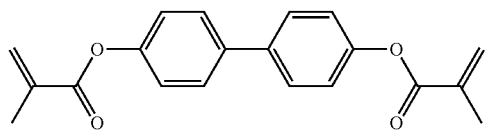

Furthermore, a photopolymerization initiator "Igacure 651" (0.1 mass %) was added thereto, and the added materials were uniformly dissolved to prepare a liquid-crystal-containing polymerization composition CLC-4.

The liquid-crystal-containing polymerization composition CLC-4 was used in place of the liquid-crystal-containing polymerization composition CLC-1, and a spacer having a thickness of 3.5 μm was used instead of the spacer having a thickness of 3.2 μm to define the thickness of the layer of the liquid-crystal-containing polymerization composition to be 3.5 μm. Except for these changes, a liquid crystal display device was produced as in Example 1.

In this liquid crystal display device, a pretilt angle θ given to the liquid crystal molecules was maintained even in a state in which voltage was not applied and was 88.0°.

Table 10 shows results of the evaluations in the liquid crystal display device. As shown in Table 10, the liquid crystal display device had an excellent contrast and response speed, excellent properties inherent in liquid crystal display devices, and good effect on a reduction in the occurrence of image sticking and droplet stains.

TABLE 10

| | |
|---|---|
| $T_{NI}/°C.$ | 71.0 |
| $\Delta_n$ | 0.100 |
| $n_o$ | 1.482 |
| $\epsilon_{//}$ | 3.42 |
| $\epsilon_\perp$ | 7.09 |
| $\Delta\epsilon$ | -3.67 |
| $\eta/mPa \cdot s$ | 16.2 |
| $\gamma_1/mPa \cdot s$ | 104 |
| Contrast | 1600 |
| Response speed/ms | 16 |
| Evaluation of droplet stains | Excellent |
| Evaluation of image sticking | Excellent |

Example 8

A compound represented by the below formula as the first polymerizable compound represented by General Formula (X1a) (1.5 mass %) and a compound represented by the below formula as the second polymerizable compound represented by General Formula (X2a) (0.4 mass %) were added to the liquid-crystal-containing starting composition LC-4 prepared in Example 7 (98.0 mass %).

[Chem. 49]

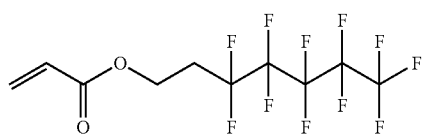

-continued

[Chem. 50]

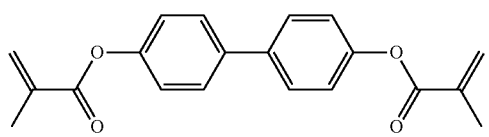

Furthermore, a photopolymerization initiator "Igacure 651" (0.1 mass %) was added thereto, the added materials were uniformly dissolved to prepare a liquid-crystal-containing polymerization composition CLC-4a, and this liquid-crystal-containing polymerization composition CLC-4a was used. Except for this change, a liquid crystal display device was produced as in Example 7.

In this liquid crystal display device, a pretilt angle θ given to the liquid crystal molecules was maintained even in a state in which voltage was not applied and was 87.3°.

Table 11 shows results of the evaluations in the liquid crystal display device. As shown in Table 11, the liquid crystal display device had an excellent contrast and response speed, excellent properties inherent in liquid crystal display devices, and good effect on a reduction in the occurrence of image sticking and droplet stains.

TABLE 11

| | |
|---|---|
| $T_{NI}/°C.$ | 71.0 |
| $\Delta_n$ | 0.100 |
| $n_o$ | 1.482 |
| $\epsilon_{//}$ | 3.42 |
| $\epsilon_\perp$ | 7.09 |
| $\Delta\epsilon$ | -3.67 |
| $\eta/mPa \cdot s$ | 16.2 |
| $\gamma_1/mPa \cdot s$ | 104 |
| Contrast | 1660 |
| Response speed/ms | 16.8 |
| Evaluation of droplet stains | Excellent |
| Evaluation of image sticking | Excellent |

Comparative Example 4

A first substrate and second substrate each provided with a vertical alignment film were prepared as in Comparative Example 1.

These substrates having the vertical alignment films were used to hold the liquid-crystal-containing starting composition LC-4 prepared in Example 7 therebetween instead of the liquid-crystal-containing polymerization composition CLC-1 (the first polymerizable compound, the second polymerizable compound, and the photopolymerization initiator were not used), and a spacer having a thickness of 3.5

μm was used instead of the spacer having a thickness of 3.2 μm to define the thickness of the layer of the liquid-crystal-containing starting composition to be 3.5 μm. Except for these changes, a liquid crystal display device was produced as in Example 1.

Table 12 shows results of the evaluations in the liquid crystal display device. As shown in Table 12, the liquid crystal display device was more unsatisfactory in response speed and effect on a reduction in the occurrence of image sticking and droplet stains than the liquid crystal display devices of Examples 7 and 8.

TABLE 12

| | |
|---|---|
| $T_{NI}/°$ C. | 71.0 |
| $\Delta_n$ | 0.100 |
| $n_o$ | 1.482 |
| $\epsilon_{//}$ | 3.42 |
| $\epsilon_\perp$ | 7.09 |
| $\Delta\epsilon$ | −3.67 |
| η/mPa · s | 16.2 |
| $\gamma_1$/mPa · s | 104 |
| Contrast | 1330 |
| Response speed/ms | 23 |
| Evaluation of droplet stains | Bad |
| Evaluation of image sticking | Good |

Example 9

A compound represented by the below formula as the first polymerizable compound represented by General Formula (X1b) (1.0 mass %) and a compound represented by the below formula as the second polymerizable compound represented by General Formula (X2a) (0.4 mass %) were added to the liquid-crystal-containing starting composition LC-1 prepared in Example 1 (98.5 mass %).

[Chem. 51]

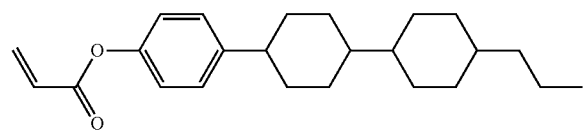

[Chem. 52]

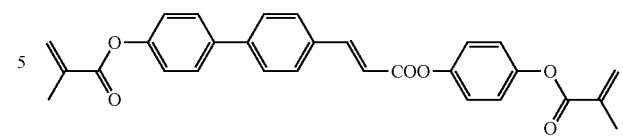

Furthermore, a photopolymerization initiator "Igacure 651" (0.1 mass %) was added thereto, the added materials were uniformly dissolved to prepare a liquid-crystal-containing polymerization composition CLC-1b, and this liquid-crystal-containing polymerization composition CLC-1b was used. Except for this change, a liquid crystal display device was produced as in Example 1.

In this liquid crystal display device, a pretilt angle θ given to the liquid crystal molecules was maintained even in a state in which voltage was not applied and was 87.6°.

Table 13 shows results of the evaluations in the liquid crystal display device. As shown in Table 13, the liquid crystal display device had an excellent contrast and response speed, excellent properties inherent in liquid crystal display devices, and good effect on a reduction in the occurrence of image sticking and droplet stains.

TABLE 13

| | |
|---|---|
| $T_{NI}/°$ C. | 75.4 |
| $\Delta_n$ | 0.107 |
| $n_o$ | 1.485 |
| $\epsilon_{//}$ | 3.55 |
| $\epsilon_\perp$ | 6.45 |
| $\Delta\epsilon$ | −2.9 |
| η/mPa · s | 20.2 |
| $\gamma_1$/mPa · s | 142 |
| Contrast | 1470 |
| Response speed/ms | 14.5 |
| Evaluation of droplet stains | Excellent |
| Evaluation of image sticking | Excellent |

Example 10

A compound represented by the below formula as the first polymerizable compound represented by General Formula (X1a) (1.0 mass %) and a compound represented by the below formula as the second polymerizable compound represented by General Formula (X2a) (0.4 mass %) were added to the liquid-crystal-containing starting composition LC-1 prepared in Example 1 (98.5 mass %).

[Chem. 53]

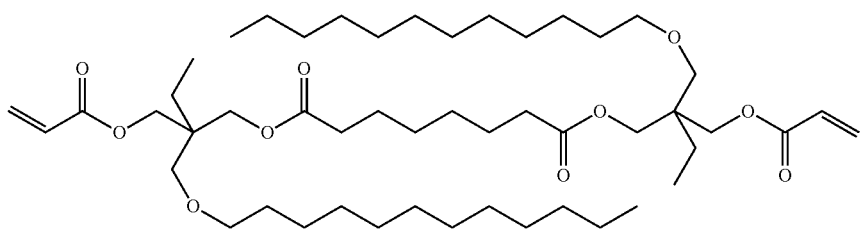

[Chem. 54]

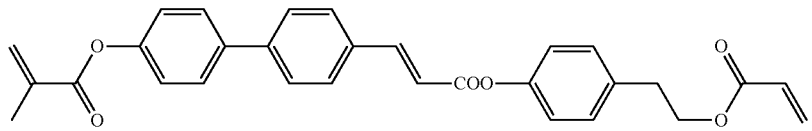

Furthermore, a photopolymerization initiator "Igacure 651" (0.1 mass %) was added thereto, and the added materials were uniformly dissolved to prepare a liquid-crystal-containing polymerization composition CLC-1c, and this liquid-crystal-containing polymerization composition CLC-1c was used. Except for this change, a liquid crystal display device was produced as in Example 1.

In this liquid crystal display device, a pretilt angle θ given to the liquid crystal molecules was maintained even in a state in which voltage was not applied and was 87.9°.

Table 14 shows results of the evaluations in the liquid crystal display device. As shown in Table 14, the liquid crystal display device had an excellent contrast and response speed, excellent properties inherent in liquid crystal display devices, and good effect on a reduction in the occurrence of image sticking and droplet stains.

TABLE 14

| | |
|---|---|
| $T_{NI}/°C$ | 75.4 |
| $\Delta_n$ | 0.107 |
| $n_o$ | 1.485 |
| $\epsilon_{//}$ | 3.55 |
| $\epsilon_\perp$ | 6.45 |
| $\Delta\epsilon$ | −2.9 |
| η/mPa·s | 20.2 |
| $\gamma_1$/mPa·s | 142 |
| Contrast | 1490 |
| Response speed/ms | 14.1 |
| Evaluation of droplet stains | Excellent |
| Evaluation of image sticking | Excellent |

Example 11

A compound represented by the below formula as the first polymerizable compound represented by General Formula (X1c) (1.2 mass %) and a compound represented by the below formula as the second polymerizable compound represented by General Formula (X2a) (0.4 mass %) were added to the liquid-crystal-containing starting composition LC-2 prepared in Example 3 (98.3 mass %).

[Chem. 55]

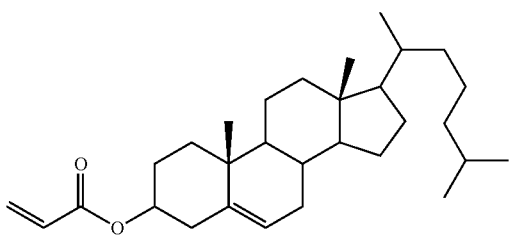

[Chem. 56]

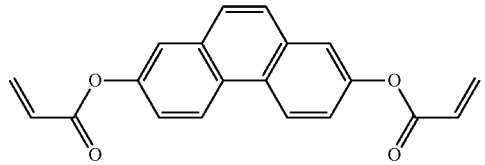

Furthermore, a photopolymerization initiator "Igacure 651" (0.1 mass %) was added thereto, the added materials were uniformly dissolved to prepare a liquid-crystal-containing polymerization composition CLC-2b, and this liquid-crystal-containing polymerization composition CLC-2b was used. Except for this change, a liquid crystal display device was produced as in Example 3.

In this liquid crystal display device, a pretilt angle θ given to the liquid crystal molecules was maintained even in a state in which voltage was not applied and was 87.8°.

Table 15 shows results of the evaluations in the liquid crystal display device. As shown in Table 15, the liquid crystal display device had an excellent contrast and response speed, excellent properties inherent in liquid crystal display devices, and good effect on a reduction in the occurrence of image sticking and droplet stains.

TABLE 15

| | |
|---|---|
| $T_{NI}/°C$ | 74.1 |
| $\Delta_n$ | 0.097 |
| $n_o$ | 1.481 |
| $\epsilon_{//}$ | 3.36 |
| $\epsilon_\perp$ | 6.63 |
| $\Delta\epsilon$ | −3.27 |
| η/mPa·s | 15.6 |
| $\gamma_1$/mPa·s | 100 |
| Contrast | 1840 |
| Response speed/ms | 20.6 |
| Evaluation of droplet stains | Excellent |
| Evaluation of image sticking | Excellent |

Example 12

A compound represented by the below formula as the first polymerizable compound represented by General Formula (X1a) (1.5 mass %) and a compound represented by the below formula as the second polymerizable compound represented by General Formula (X2a) (0.3 mass %) were added to the liquid-crystal-containing starting composition LC-3 prepared in Example 5 (98.1 mass %).

[Chem. 57]

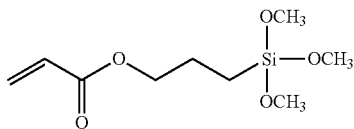

[Chem. 58]

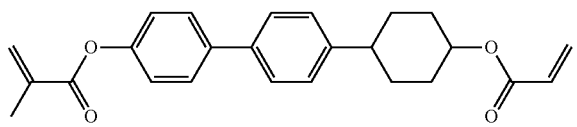

Furthermore, a photopolymerization initiator "Igacure 651" (0.1 mass %) was added thereto, the added materials were uniformly dissolved to prepare a liquid-crystal-containing polymerization composition CLC-3b, and this liquid-crystal-containing polymerization composition CLC-3b was used. Except for this change, a liquid crystal display device was produced as in Example 5.

In this liquid crystal display device, a pretilt angle θ given to the liquid crystal molecules was maintained even in a state in which voltage was not applied and was 87.5°.

Table 16 shows results of the evaluations in the liquid crystal display device. As shown in Table 16, the liquid crystal display device had an excellent contrast and response speed, excellent properties inherent in liquid crystal display devices, and good effect on a reduction in the occurrence of image sticking and droplet stains.

TABLE 16

| | |
|---|---|
| $T_{NI}$/° C. | 73.4 |
| $\Delta_n$ | 0.098 |
| $n_o$ | 1.437 |
| $\epsilon_{//}$ | 3.26 |
| $\epsilon_{\perp}$ | 6.63 |
| $\Delta\epsilon$ | -3.37 |
| η/mPa · s | 15.5 |
| $\gamma_1$/mPa · s | 94 |
| Contrast | 1620 |
| Response speed/ms | 18.5 |
| Evaluation of droplet stains | Excellent |
| Evaluation of image sticking | Excellent |

Example 13

A compound represented by the below formula as the first polymerizable compound represented by General Formula (X1a) (1.5 mass %) and a compound represented by the below formula as the second polymerizable compound represented by General Formula (X2a) (0.3 mass %) were added to the liquid-crystal-containing starting composition LC-3 prepared in Example 5 (98.1 mass %).

Furthermore, a photopolymerization initiator "Igacure 651" (0.1 mass %) was added thereto, the added materials were uniformly dissolved to prepare a liquid-crystal-containing polymerization composition CLC-3c, and this liquid-crystal-containing polymerization composition CLC-3c was used. Except for this change, a liquid crystal display device was produced as in Example 5.

In this liquid crystal display device, a pretilt angle θ given to the liquid crystal molecules was maintained even in a state in which voltage was not applied and was 87.3°.

Table 17 shows results of the evaluations in the liquid crystal display device. As shown in Table 17, the liquid crystal display device had an excellent contrast and response speed, excellent properties inherent in liquid crystal display devices, and good effects on a reduction in the occurrence of image sticking and droplet stains.

TABLE 17

| | |
|---|---|
| $T_{NI}$/° C. | 73.4 |
| $\Delta_n$ | 0.098 |
| $n_o$ | 1.437 |
| $\epsilon_{//}$ | 3.26 |
| $\epsilon_{\perp}$ | 6.63 |
| $\Delta\epsilon$ | -3.37 |
| η/mPa · s | 15.5 |
| $\gamma_1$/mPa · s | 94 |
| Contrast | 1650 |
| Response speed/ms | 18.3 |
| Evaluation of droplet stains | Excellent |
| Evaluation of image sticking | Excellent |

Example 14

A compound represented by the below formula as the first polymerizable compound represented by General Formula (X1a) (1.5 mass %) and a compound represented by the below formula as the second polymerizable compound represented by General Formula (X2a) (0.4 mass %) were added to the liquid-crystal-containing starting composition LC-4 prepared in Example 7 (98.0 mass %).

[Chem. 59]

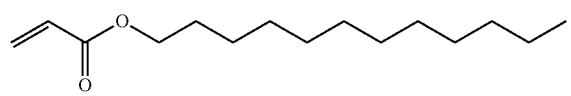

[Chem. 60]

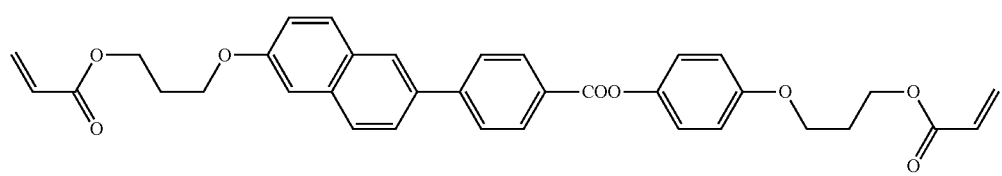

[Chem. 61]

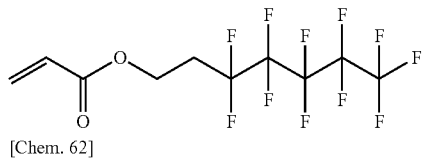

[Chem. 62]

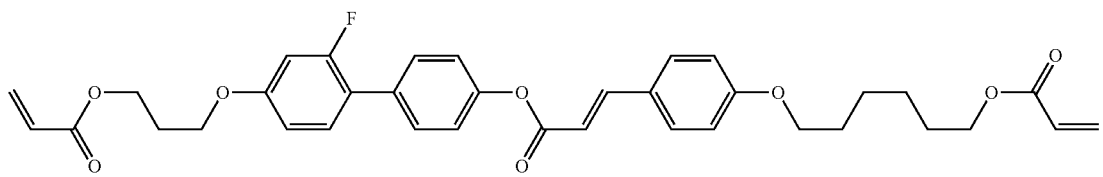

Furthermore, a photopolymerization initiator "Igacure 651" (0.1 mass %) was added thereto, the added materials were uniformly dissolved to prepare a liquid-crystal-containing polymerization composition CLC-4b, and this liquid-crystal-containing polymerization composition CLC-4b was used. Except for this change, a liquid crystal display device was produced as in Example 7.

In this liquid crystal display device, a pretilt angle θ given to the liquid crystal molecules was maintained even in a state in which voltage was not applied and was 87.4°.

Table 18 shows results of the evaluations in the liquid crystal display device. As shown in Table 18, the liquid crystal display device had an excellent contrast and response speed, excellent properties inherent in liquid crystal display devices, and good effect on a reduction in the occurrence of image sticking and droplet stains.

TABLE 18

| | |
|---|---|
| $T_{NI}/°$ C. | 71.0 |
| $\Delta_n$ | 0.100 |
| $n_o$ | 1.482 |
| $\epsilon_{//}$ | 3.42 |
| $\epsilon_\perp$ | 7.09 |
| $\Delta\epsilon$ | -3.67 |
| $\eta$/mPa · s | 16.2 |
| $\gamma_1$/mPa · s | 104 |
| Contrast | 1640 |
| Response speed/ms | 16.6 |
| Evaluation of droplet stains | Excellent |
| Evaluation of image sticking | Excellent |

Example 15

A compound represented by the below formula as the first polymerizable compound represented by General Formula (X1a) (1.5 mass %) and a compound represented by the below formula as the second polymerizable compound represented by General Formula (X2a) (0.4 mass %) were added to the liquid-crystal-containing starting composition LC-4 prepared in Example 7 (98.0 mass %).

[Chem. 63]

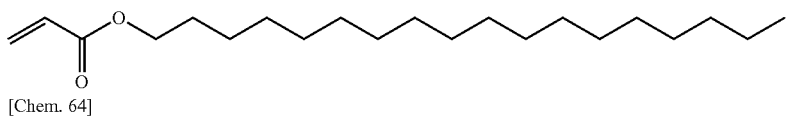

[Chem. 64]

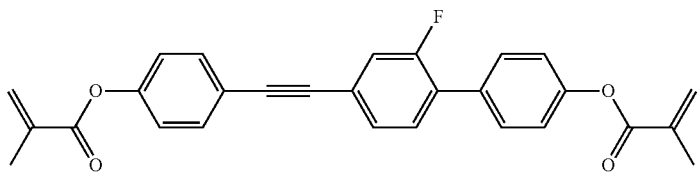

Furthermore, a photopolymerization initiator "Igacure 651" (0.1 mass %) was added thereto, the added materials were uniformly dissolved to prepare a liquid-crystal-containing polymerization composition CLC-4c, and this liquid-crystal-containing polymerization composition CLC-4c was used. Except for this change, a liquid crystal display device was produced as in Example 7.

In this liquid crystal display device, a pretilt angle θ given to the liquid crystal molecules was maintained even in a state in which voltage was not applied and was 87.1°.

Table 19 shows results of the evaluations in the liquid crystal display device. As shown in Table 19, the liquid crystal display device had an excellent contrast and response speed, excellent properties inherent in liquid crystal display devices, and good effect on a reduction in the occurrence of image sticking and droplet stains.

TABLE 19

| | |
|---|---|
| $T_{NI}/°$ C. | 71.0 |
| $\Delta_n$ | 0.100 |
| $n_o$ | 1.482 |
| $\epsilon_{//}$ | 3.42 |
| $\epsilon_\perp$ | 7.09 |
| $\Delta\epsilon$ | -3.67 |

TABLE 19-continued

| | |
|---|---|
| η/mPa · s | 16.2 |
| γ₁/mPa · s | 104 |
| Contrast | 1630 |
| Response speed/ms | 16.4 |
| Evaluation of droplet stains | Excellent |
| Evaluation of image sticking | Excellent |

REFERENCE LIST

10 . . . Liquid crystal display device, 11 . . . First substrate, 12 . . . Second substrate, 13 . . . Liquid crystal layer, 14 . . . Common electrode, 15 . . . Pixel electrode, 18 . . . Color filter, 19 . . . Liquid crystal molecules

The invention claimed is:

1. A liquid crystal display device in which a liquid crystal layer containing a liquid crystal composition is disposed between a first substrate provided with a common electrode and a color filter layer and a second substrate provided with a plurality of pixels each having a pixel electrode, the liquid crystal display device comprising:
   orientation controlling layers formed of at least two polymerizable compounds and disposed between the first substrate and the liquid crystal layer and between the second substrate and the liquid crystal layer without the presence of an alignment film, wherein
   each of the pixels has at least two regions having different directions of pretilt, and
   the liquid crystal composition contains at least one compound represented by General Formula (I)

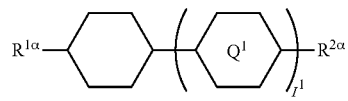
(I)

(where $R^{1\alpha}$ and $R^{2\alpha}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Q^1$ represents a 1,4-phenylene group or a trans-1,4-cyclohexylene group; $l^1$ represents 1 or 2; and in the case where $l^1$ is 2, the two $Q^1$'s may be the same as or different from each other) and a compound represented by General Formula (II)

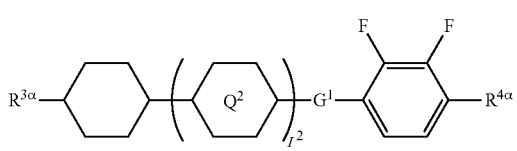
(II)

(where $R^{3\alpha}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{4\alpha}$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; $Q^2$ represents a 1,4-phenylene group or a trans-1,4-cyclohexylene group; $l^2$ represents 0, 1, or 2; in the case where $l^2$ is 2, the two $Q^2$'s may be the same as or different from each other; and $G^1$ is a single bond, —CH₂CH₂—, —CH₂O—, —OCH₂—, —CF₂O—, or —OCF₂—), wherein said at least two polymerizable compounds include a first polymerizable compound and a second polymerizable compound, the first polymerizable compound being at least one compound selected from the group consisting of compounds represented by General Formula (X1a), General Formula (X1b) and General Formula (X1c), and the second polymerizable compound being at least one compound selected from the group consisting of compounds represented by General Formula (X2a);

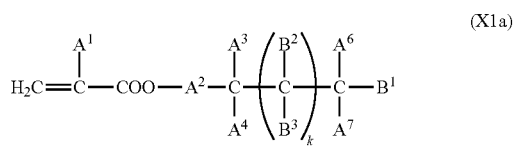
(X1a)

where $A^1$ represents a hydrogen atom or a methyl group;
$A^2$ represents a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other; and one or more hydrogen atoms contained in the alkylene group are each independently optionally substituted with a fluorine atom, a methyl group, or an ethyl group;
$A^3$ and $A^6$ each independently represent a hydrogen atom, a halogen atom, or an alkyl group having 1 to 18 carbon atoms (one or more methylene groups contained in the alkyl group are each independently optionally substituted with an oxygen atom, —CO—, —COO—, or —OCO— such that oxygen atoms are not directly bonded to each other; and one or more hydrogen atoms contained in the alkyl group are each independently optionally substituted with a halogen atom or an alkyl group having 1 to 17 carbon atoms);
$A^4$ and $A^7$ each independently represent a hydrogen atom, a halogen atom, or an alkyl group having 1 to 10 carbon atoms (one or more methylene groups contained in the alkyl group are each independently optionally substituted with an oxygen atom, —CO—, —COO—, or —OCO— such that oxygen atoms are not directly bonded to each other; and one or more hydrogen atoms contained in the alkyl group are each independently optionally substituted with a halogen atom or an alkyl group having 1 to 9 carbon atoms);
k is from 1 to 40;
$B^1$, $B^2$, and $B^3$ each independently represent a hydrogen atom, a linear or branched alkyl group having 1 to 10 carbon atoms (one or more methylene groups contained in the alkyl group are each independently optionally substituted with an oxygen atom, —CO—, —COO—, or —OCO— such that oxygen atoms are not directly bonded to each other; and one or more hydrogen atoms contained in the alkyl group are each independently optionally substituted with a halogen atom or a trialkoxysilyl group having 3 to 6 carbon atoms), or a group represented by General Formula (I-b)

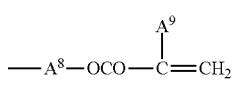
(I-b)

(where $A^9$ represents a hydrogen atom or a methyl group; and
$A^8$ represents a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other; and one or more hydrogen atoms contained in the alkylene group are each independently optionally substituted with a fluorine atom, a methyl group, or an ethyl group), where among $B^1$, $B^2$, and $B^3$ that are present in the number of 2k+1 in total, the number of the groups represented by General Formula (I-b) is 0 or 1),
compounds represented by General Formula (XIb)

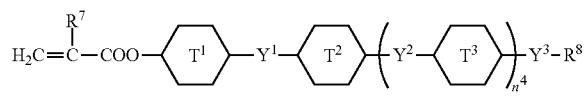
(XIb)

(where $R^7$ represents a hydrogen atom or a methyl group;
six-membered rings $T^1$, $T^2$, and $T^3$ each independently represent any of the following structures

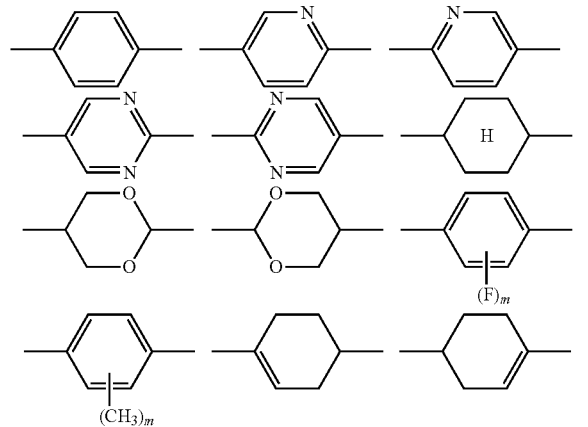

(where m is an integer from 1 to 4);
$n^4$ represents 0 or 1;
$Y^1$ and $Y^2$ each independently represent a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH$_2$=CHCH$_2$CH$_2$—, or —CH$_2$CH$_2$CH=CH—;
$Y^3$ represents a single bond, —COO—, or —OCO—; and
$R^8$ represents a hydrocarbon group having 1 to 18 carbon atoms), and compounds represented by General Formula (XIc)

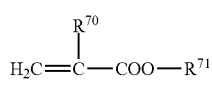
(XIc)

(where $R^{70}$ represents a hydrogen atom or a methyl group, and
$R^{71}$ represents a hydrocarbon group having fused rings); and

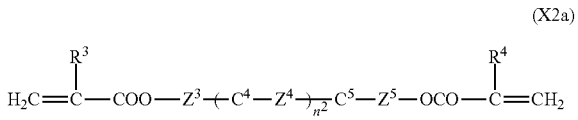
(X2a)

(where $R^3$ and $R^4$ each independently represent a hydrogen atom or a methyl group;
$C^4$ and $C^5$ each independently represent a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a phenanthrene-2,7-diyl group, an anthracene-2,6-diyl group, a 2,6-naphthylene group, or an indane-2,5-diyl group (among these groups, one or more hydrogen atoms of the 1,4-phenylene group, 1,2,3,4-tetrahydronaphthalene-2,6-diyl group, 2,6-naphthylene group, and indane-2,5-diyl group are each independently optionally substituted with a fluorine atom, a chlorine atom, a methyl group, a trifluoromethyl group, or a trifluoromethoxy group);
$Z^3$ and $Z^5$ each independently represent a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other; and one or more hydrogen atoms contained in the alkylene group are each independently optionally substituted with a fluorine atom, a methyl group, or an ethyl group);
$Z^4$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —CH=CHCOO—, —OCOCH=CH—, —COO—, or —OCO—;
$n^2$ represents 0, 1, or 2; and in the case where $n^2$ is 2, multiple $C^4$'s may be the same as or different from each other, and multiple $Z^4$'s may be the same as or different from each other),
wherein the at least one compound represented by General Formula (I) comprises a compound represented by formula (I-1)

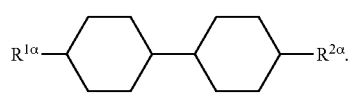
(I-1)

2. The liquid crystal display device according to claim 1, wherein the pixel electrode has a slit.

3. The liquid crystal display device according to claim 1, wherein at least any one of the first substrate and the second substrate is provided with a structure that defines the direction of pretilt.

4. The liquid crystal display device according to claim 1, further comprising a passivation film disposed at least any one of the positions between the first substrate and the liquid crystal layer and between the second substrate and the liquid crystal layer.

5. The liquid crystal display device according to claim 1, further comprising a planarization film disposed at least any one of the positions between the first substrate and the liquid crystal layer and between the second substrate and the liquid crystal layer.

6. A method for manufacturing a liquid crystal display device in which a liquid crystal layer containing a liquid crystal composition is disposed between a first substrate provided with a common electrode and a color filter layer and a second substrate provided with a plurality of pixels each having a pixel electrode and in which each of the pixels has at least two regions having different directions of pretilt, the method comprising:
disposing a liquid-crystal-containing polymerization composition between the first substrate and the second substrate without formation of an alignment film, the liquid-crystal-containing polymerization composition containing at least one compound represented by General Formula (I)

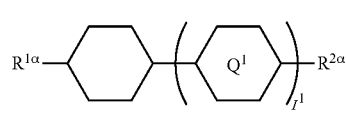

(I)

(where $R^{1\alpha}$ and $R^{2\alpha}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Q^1$ represents a 1,4-phenylene group or a trans-1,4-cyclohexylene group; $l^1$ represents 1 or 2; and in the case where $l^1$ is 2, the two $Q^1$'s may be the same as or different from each other), a compound represented by General Formula (II)

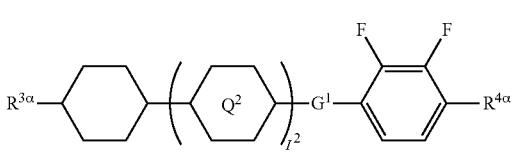

(II)

(where $R^{3\alpha}$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^{4\alpha}$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; $Q^2$ represents a 1,4-phenylene group or a trans-1,4-cyclohexylene group; $l^2$ represents 0, 1, or 2; in the case where $l^2$ is 2, the two $Q^2$'s may be the same as or different from each other; and $G^1$ is a single bond, $-CH_2CH_2-$, $-CH_2O-$, $-OCH_2-$, $-CF_2O-$, or $-OCF_2-$), and at least two polymerizable compounds; and forming orientation controlling layers between the first substrate and the liquid crystal layer and between the second substrate and the liquid crystal layer by polymerization of the at least two polymerizable compounds with conversion of the liquid-crystal-containing polymerization composition into the liquid crystal composition through irradiation with an active energy ray in a state in which voltage that is for giving a pretilt angle to liquid crystal molecules in the liquid-crystal-containing polymerization composition is applied between the pixel electrode and the common electrode, wherein said at least two polymerizable compounds include a first polymerizable compound and a second polymerizable compound, the first polymerizable compound being at least one compound selected from the group consisting of compounds represented by General Formula (X1a), General Formula (X1b) and General Formula (X1c), and the second polymerizable compound being at least one compound selected from the group consisting of compounds represented by General Formula (X2a);

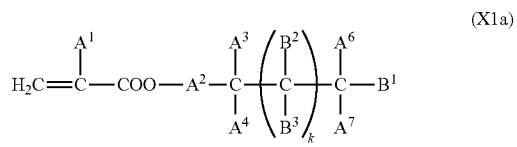

(X1a)

where $A^1$ represents a hydrogen atom or a methyl group;
$A^2$ represents a single bond or an alkylene group having 1 to 15 carbon atoms (one or more methylene groups contained in the alkylene group are each independently optionally substituted with an oxygen atom, $-CO-$, $-COO-$, or $-OCO-$ such that oxygen atoms are not directly bonded to each other; and one or more hydrogen atoms contained in the alkylene group are each independently optionally substituted with a fluorine atom, a methyl group, or an ethyl group;
$A^3$ and $A^6$ each independently represent a hydrogen atom, a halogen atom, or an alkyl group having 1 to 18 carbon atoms (one or more methylene groups contained in the alkyl group are each independently optionally substituted with an oxygen atom, $-CO-$, $-COO-$, or $-OCO-$ such that oxygen atoms are not directly bonded to each other; and one or more hydrogen atoms contained in the alkyl group are each independently optionally substituted with a halogen atom or an alkyl group having 1 to 17 carbon atoms);
$A^4$ and $A^7$ each independently represent a hydrogen atom, a halogen atom, or an alkyl group having 1 to 10 carbon atoms (one or more methylene groups contained in the alkyl group are each independently optionally substituted with an oxygen atom, $-CO-$, $-COO-$, or $-OCO-$ such that oxygen atoms are not directly bonded to each other; and one or more hydrogen atoms contained in the alkyl group are each independently optionally substituted with a halogen atom or an alkyl group having 1 to 9 carbon atoms);
k is from 1 to 40;
$B^1$, $B^2$, and $B^3$ each independently represent a hydrogen atom, a linear or branched alkyl group having 1 to 10 carbon atoms (one or more methylene groups contained in the alkyl group are each independently optionally substituted with an oxygen atom, —CO—, —COO—, or —OCO— such that oxygen atoms are not directly bonded to each other; and one or more hydrogen atoms contained in the alkyl group are each independently optionally substituted with a halogen atom or a trialkoxysilyl group having 3 to 6 carbon atoms), or a group represented by General Formula (I-b)

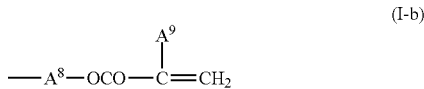

(I-b)

(where $A^9$ represents a hydrogen atom or a methyl group; and
$A^8$ represents a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other; and one or more hydrogen atoms contained in the alkylene group are each independently optionally substituted with a fluorine atom, a methyl group, or an ethyl group), where among $B^1$, $B^2$, and $B^3$ that are present in the number of 2k+1 in total, the number of the groups represented by General Formula (I-b) is 0 or 1),
compounds represented by General Formula (XIb)

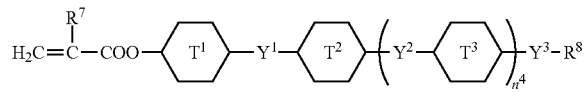

(XIb)

(where $R^7$ represents a hydrogen atom or a methyl group; six-membered rings $T^1$, $T^2$, and $T^3$ each independently represent any of the following structures

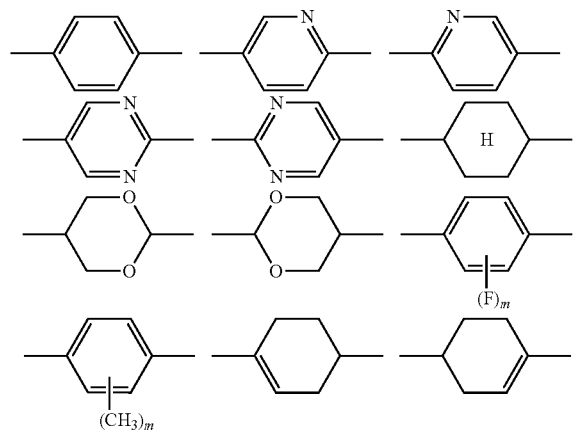

(where m is an integer from 1 to 4);
$n^4$ represents 0 or 1;
$Y^1$ and $Y^2$ each independently represent a single bond, —CH$_2$CH$_2$—, —CH$_2$O—, —OCH$_2$—, —COO—, —OCO—, —C≡C—, —CH═CH—, —CF═CF—, —(CH$_2$)$_4$—, —CH$_2$CH$_2$CH$_2$O—, —OCH$_2$CH$_2$CH$_2$—, —CH$_2$═CHCH$_2$CH$_2$—, or —CH$_2$CH$_2$CH═CH—;
$Y^3$ represents a single bond, —COO—, or —OCO—; and
$R^8$ represents a hydrocarbon group having 1 to 18 carbon atoms), and compounds represented by General Formula (X1c)

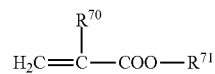

(X1c)

(where $R^{70}$ represents a hydrogen atom or a methyl group, and
$R^{71}$ represents a hydrocarbon group having fused rings); and

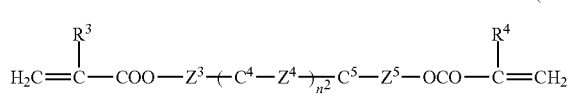

(X2a)

(where $R^3$ and $R^4$ each independently represent a hydrogen atom or a methyl group;
$C^4$ and $C^5$ each independently represent a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a phenanthrene-2,7-diyl group, an anthracene-2,6-diyl group, a 2,6-naphthylene group, or an indane-2,5-diyl group (among these groups, one or more hydrogen atoms of the 1,4-phenylene group, 1,2,3,4-tetrahydronaphthalene-2,6-diyl group, 2,6-naphthylene group, and indane-2,5-diyl group are each independently optionally substituted with a fluorine atom, a chlorine atom, a methyl group, a trifluoromethyl group, or a trifluoromethoxy group);
$Z^3$ and $Z^5$ each independently represent a single bond or an alkylene group having 1 to 15 carbon atoms (one or more methylene groups contained in the alkylene group are each independently optionally substituted with an oxygen atom, —CO—, —COO—, or —OCO— such that oxygen atoms are not directly bonded to each other; and one or more hydrogen atoms contained in the alkylene group are each independently optionally substituted with a fluorine atom, a methyl group, or an ethyl group);
$Z^4$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH═CH—, —C≡C—, —CF$_2$O—, —OCF$_2$—, —CH═CHCOO—, —OCOCH═CH—, —COO—, or —OCO—;
$n^2$ represents 0, 1, or 2; and in the case where $n^2$ is 2, multiple $C^4$'s may be the same as or different from each other, and multiple $Z^4$'s may be the same as or different from each other), wherein the at least one compound represented by General Formula (I) comprises a compound represented by formula (I-1)

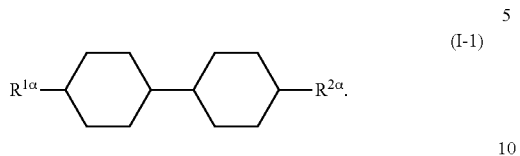
(I-1)

7. The method for manufacturing a liquid crystal display device according to claim 6, wherein the active energy ray is ultraviolet having multiple spectra.

8. The method for manufacturing a liquid crystal display device according to claim 6, wherein the pixel electrode has a slit, or at least any one of the first substrate and the second substrate has a structure that defines the direction of pretilt.

* * * * *